(12) United States Patent
Yamashita et al.

(10) Patent No.: US 11,597,434 B2
(45) Date of Patent: Mar. 7, 2023

(54) STEERING CONTROL SYSTEM

(71) Applicants: Toyota Jidosha Kabushiki Kaisha, Toyota (JP); JTEKT Corporation, Osaka (JP); Denso Corporation, Kariya (JP)

(72) Inventors: Masaharu Yamashita, Toyota (JP); Atsushi Sato, Miyoshi (JP); Masataka Okuda, Toyota (JP); Yosuke Yamashita, Nagoya (JP); Shintaro Takayama, Toyota (JP); Shunsuke Hiromasa, Toyota (JP); Toshiyuki Mikida, Gifu-ken (JP); Shoji Kubota, Miyoshi (JP); Yuji Fujita, Okazaki (JP); Kenichi Abe, Okazaki (JP); Toshimitsu Sakai, Kariya (JP)

(73) Assignees: TOYOTA JIDOSHA KABUSHIKI KAISHA, Toyota (JP); JTEKT CORPORATION, Osaka (JP); DENSO CORPORATION, Kariya (JP)

( * ) Notice: Subject to any disclaimer, the term of this patent is extended or adjusted under 35 U.S.C. 154(b) by 492 days.

(21) Appl. No.: 16/849,114

(22) Filed: Apr. 15, 2020

(65) Prior Publication Data
US 2020/0331522 A1 Oct. 22, 2020

(30) Foreign Application Priority Data
Apr. 17, 2019 (JP) .............................. JP2019-078767

(51) Int. Cl.
*B62D 5/04* (2006.01)
*B62D 5/00* (2006.01)

(52) U.S. Cl.
CPC ........... *B62D 5/0484* (2013.01); *B62D 5/006* (2013.01); *B62D 5/0463* (2013.01)

(58) Field of Classification Search
CPC .... B62D 5/0484; B62D 5/006; B62D 5/0463; B62D 5/003
See application file for complete search history.

(56) References Cited

U.S. PATENT DOCUMENTS 9,376,107 B2 * 6/2016 Suzuki ................ B60W 30/045
9,637,167 B2 * 5/2017 Miyasaka ................ B62D 6/10
(Continued)

FOREIGN PATENT DOCUMENTS

| JP | 2004-338563 A | 12/2004 |
|---|---|---|
| JP | 2007-022194 A | 2/2007 |

(Continued)

*Primary Examiner* — Kevin Hurley
*Assistant Examiner* — Michael R Stabley
(74) *Attorney, Agent, or Firm* — Dinsmore & Shohl LLP

(57) ABSTRACT

An actuator that applies force to a member associated with steering, and a control device that controls the actuator, have duplex configuration. First and second control devices compute the same controlled variable as first and second controlled variables, respectively. In a normal mode, the control device controls the actuator according to the first controlled variable. The first and second control devices send and receive respectively computed controlled variables to and from each other via communications. When a discrepancy arises between the first and second controlled variables, or an abnormality occurs in communications between the first and second control devices, the operating mode is switched from the normal mode to an independent mode. In the independent mode, the first and second control devices control the first and second actuators, according to the first and second controlled variables, respectively.

8 Claims, 20 Drawing Sheets

(56) References Cited

U.S. PATENT DOCUMENTS

| | | | |
|---|---|---|---|
| 9,688,301 B2* | 6/2017 | Shibuya | B60W 10/04 |
| 10,862,417 B2* | 12/2020 | Kuramitsu | H02P 6/10 |
| 2019/0009813 A1* | 1/2019 | Siskoy | B62D 5/0484 |
| 2019/0260324 A1 | 8/2019 | Kuramitsu et al. | |
| 2020/0079421 A1* | 3/2020 | Kano | B62D 5/0484 |

FOREIGN PATENT DOCUMENTS

| | | |
|---|---|---|
| JP | 2018-130007 A | 8/2018 |
| RU | 2329170 C2 | 7/2008 |
| WO | 2005063524 A1 | 7/2005 |

* cited by examiner

STEERING CONTROL SYSTEM

CROSS-REFERENCE TO RELATED APPLICATIONS

This application claims priority to Japanese Patent Application No. 2019-078767 filed on Apr. 17, 2019, which is incorporated herein by reference in its entirety including the specification, drawings and abstract.

BACKGROUND

1. Technical Field

The disclosure relates to a steering control system that controls steering of a vehicle.

2. Description of Related Art

A steering apparatus for a vehicle is disclosed in Japanese Unexamined Patent Application Publication No. 2007-022194 (JP 2007-022194 A). The vehicular steering apparatus includes a main system and a redundant means. The main system has a main turning motor that generates force for turning wheels, and a main power supply that supplies electric power to the main turning motor. The redundant means has a sub turning motor or sub power supply that operates in a backup mode when the main system malfunctions.

SUMMARY

An actuator is used for moving a member associated with steering of the vehicle. The actuator applies force to the member when it is controlled by a control device.

If an abnormality occurs in the control device, the actuator controlled by the control device may generate erroneous force. It is undesirable, in terms of vehicle traveling, that erroneous force is applied to the member associated with steering. Also, when erroneous force is applied to the member associated with steering, the driver of the vehicle may feel strange or uncomfortable about steering.

It may also be considered to provide a backup control device, in addition to a main control device, in case of occurrence of an abnormality. In this case, when it is confirmed that an abnormality has occurred in the main control device, the backup control device starts control instead. However, it takes a certain length of time until the control device confirms occurrence of the abnormality. Namely, there is a certain period of time between occurrence of the abnormality and actual switching of the control device. During this period, erroneous force is kept applied to the member associated with steering.

The disclosure provides a technology for promptly curbing an influence of erroneous output of an actuator on a member associated with steering of a vehicle.

One aspect of the disclosure is concerned with a steering control system that controls steering of a vehicle. The steering control system includes an actuator configured to apply force to a member associated with the steering, and a control device configured to control the actuator. The actuator has a duplex configuration including a first actuator of a main system and a second actuator of a subsidiary system. The control device has a duplex configuration including a first control device that belongs to the main system, and a second control device that belongs to the subsidiary system. The first control device and the second control device are configured to compute the same controlled variable as a first controlled variable and a second controlled variable, respectively. The control device has operating modes including a normal mode in which at least one of the first actuator and the second actuator is controlled according to the first controlled variable, without using the second controlled variable, and an independent mode in which the first control device controls the first actuator according to the first controlled variable, and the second control device controls the second actuator according to the second controlled variable. In the normal mode, the first control device and the second control device are configured to communicate with each other, and the first control device is configured to send the first controlled variable to the second control device, while the second control device is configured to send the second controlled variable to the first control device. The control device is configured to switch the operating mode from the normal mode to the independent mode, in at least one of the case where a discrepancy arises between the first controlled variable and the second controlled variable, and the case where a communication abnormality occurs in communications between the first control device and the second control device.

In the steering control system as described above, each of the first control device and the second control device may have a self-diagnosis function of detecting an abnormality in itself. The operating modes of the control device may further include a backup mode in which, when occurrence of the abnormality in one of the first control device and the second control device is confirmed through the self-diagnosis function, the other of the first control device and the second control device controls the actuator. The start time of the independent mode may be earlier than that of the backup mode.

In the steering control system as described above, in the normal mode, the first control device may control the first actuator according to the first controlled variable, and the second control device may control the second actuator according to the first controlled variable received from the first control device.

In the steering control system as described above, in the normal mode, the first control device may determine whether the discrepancy or the communication abnormality has occurred, based on the second controlled variable received from the second control device, and the second control device may determine whether the discrepancy or the communication abnormality has occurred, based on the first controlled variable received from the first control device.

In the steering control system as described above, the first control device may determine that the discrepancy has occurred when a difference between the first controlled variable and the second controlled variable received from the second control device is equal to or larger than a threshold value. The second control device may determine that the discrepancy has occurred when a difference between the second controlled variable and the first controlled variable received from the first control device is equal to or larger than the threshold value.

In the steering control system as described above, one of the first control device and the second control device may be a detection control device configured to detect the discrepancy or the communication abnormality. When the discrepancy or the communication abnormality is detected, the detection control device may be configured to start operating in the independent mode, and notify the other of the first control device and the second control device of switching from the normal mode to the independent mode. The other of the first control device and the second control device may be configured to start operating in the independent mode, in response to a notification from the detection control device.

The vehicle may be a steer-by-wire vehicle including a steering wheel and wheels that are mechanically disconnected from each other. The steering control system may further include a turning actuator configured to turn the wheels, a reaction force actuator configured to apply reaction torque to the steering wheel, a turning control device configured to control the turning actuator according to steering operation of the steering wheel, and a reaction force control device configured to control the reaction force actuator according to the steering operation of the steering wheel. At least one of the turning control device and the reaction force control device may be the control device having the duplex configuration. When the turning control device is the control device having the duplex configuration, the member may be the wheels, and the turning actuator may be the actuator having the duplex configuration. When the reaction force control device is the control device having the duplex configuration, the member may be the steering wheel, and the reaction force actuator may be the actuator having the duplex configuration.

In the steering control system as described above, each of the turning control device and the reaction force control device may be the control device having the duplex configuration When one of the turning control device and the reaction force control device switches the operating mode from the normal mode to the independent mode, the other of the turning control device and the reaction force control device may be configured to switch the operating mode from the normal mode to the independent mode.

According to the above aspect of the disclosure, the actuator that applies force to the member associated with steering has duplex configuration including the first actuator of the main system and the second actuator of the subsidiary system. The control device that controls the actuator has duplex configuration including the first control device of the main system and the second control device of the subsidiary system. The first control device and the second control device compute the same controlled variable as the first controlled variable and the second controlled variable, respectively.

In the normal mode, the control device controls at least one of the first actuator and the second actuator, according to the first controlled variable computed by the first control device. With this control, noise and vibration are less likely or unlikely to be generated in the actuator.

However, when an abnormality occurs in the first control device, the first controlled variable computed by the first control device may become an erroneous value. When the first controlled variable becomes an erroneous value, the actuator generates erroneous force. In view of this situation, the independent mode is provided, in addition to the normal mode.

In the independent mode, the first control device controls the first actuator according to the first controlled variable, and the second control device controls the second actuator according to the second controlled variable. Even when the first controlled variable becomes an erroneous value, the second actuator controlled according to the correct second controlled variable generates correct force. Even when the first actuator attempts to move the member with erroneous force, the second actuator moves the member with correct force at the same time. Namely, the normal second actuator functions to compensate for erroneous output of the first actuator. As a result, an influence of erroneous output of the actuator on the member is curbed (alleviated).

Also, switching from the normal mode to the independent mode is executed in response to detection of an "abnormality sign". More specifically, during the normal mode, the first control device and the second control device send and receive the respectively computed controlled variables (the first controlled variable, the second controlled variable) to and from each other, via communications. When a discrepancy arises between the first controlled variable and the second controlled variable, or when an abnormality occurs in communications between the first control device and the second control device, the control device detects it as an abnormality sign. The abnormality sign can be detected earlier than confirmation of occurrence of the abnormality. Accordingly, the independent mode can be promptly started.

As described above, according to the disclosure, when an abnormality occurs in the first control device of the main system, an influence of erroneous output of the actuator on the member associated with steering of the vehicle can be quickly curbed (alleviated). As a result, steering, or vehicle traveling, is stabilized. Also, the driver is less likely or unlikely to feel strange or uncomfortable about steering and vehicle traveling.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Some embodiments of the disclosure will be described with reference to the drawings.

1. First Embodiment 1-1. Steering Control System

Figure 1:
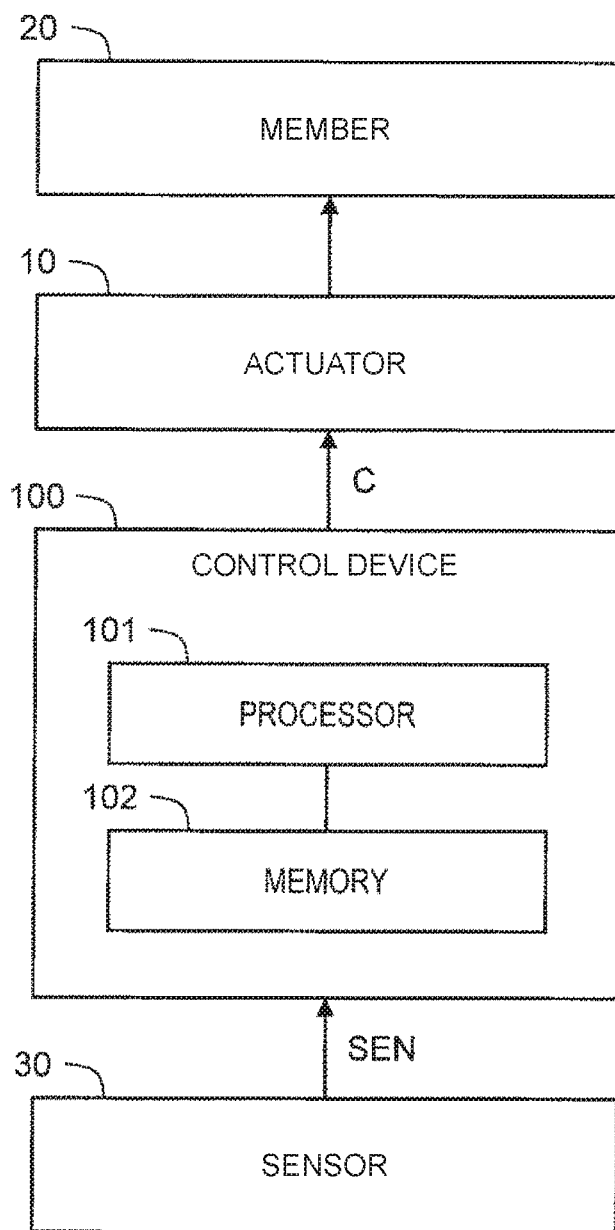
FIG. 1 is a block diagram schematically showing the configuration of a steering control system according to a first embodiment of the disclosure.

FIG. 1 is a block diagram schematically showing the configuration of a steering control system 1 according to a first embodiment. The steering control system 1 is installed on a vehicle, and controls steering of the vehicle. The steering control system 1 includes an actuator 10 and a control device 100.

The actuator 10 is coupled to a member 20 associated with steering of the vehicle, and is able to apply force to the member 20. An electric motor is one example of the actuator 10. Examples of the member 20 include wheels, and a steering wheel.

The control device 100 controls the actuator 10. The control device 100 includes a microcomputer having a processor 101 and a memory 102. The control device 100 may also include a drive circuit (e.g., inverter) that drives the actuator 10. The processor 101 executes control programs stored in the memory 102, so that the control device 100 implements various sorts of processing.

A sensor 30, which represents a plurality of sensors, detects information needed for control of the actuator 10 by the control device 100. For example, the sensor 30 detects steering operation (e.g., steering angle, steering torque) performed by a driver of the vehicle, operating conditions of the actuator 10 (e.g., rotational angle, rotational speed, and drive current of the electric motor), traveling conditions (e.g., vehicle speed) of the vehicle, and so forth. The sensor 30 sends detection information SEN indicating detection results to the control device 100.

The control device 100 computes a controlled variable C used for controlling the actuator 10, based on the detection information SEN. Examples of the controlled variable C include a target turning angle of the wheels, target rotational angle of the actuator 10, target rotational speed of the actuator 10, target torque of the actuator 10, target current that drives the actuator 10, current control signal, and so forth. The control device 100 controls the actuator 10 according to the controlled variable C. For example, where the actuator 10 is an electric motor, and the controlled variable C is a target rotational angle, the control device 100 controls the electric motor in a feedback fashion, so that the rotational angle of the electric motor becomes equal to the target rotational angle.

1-2. Duplex Configuration of Steering Control System

Figure 2:
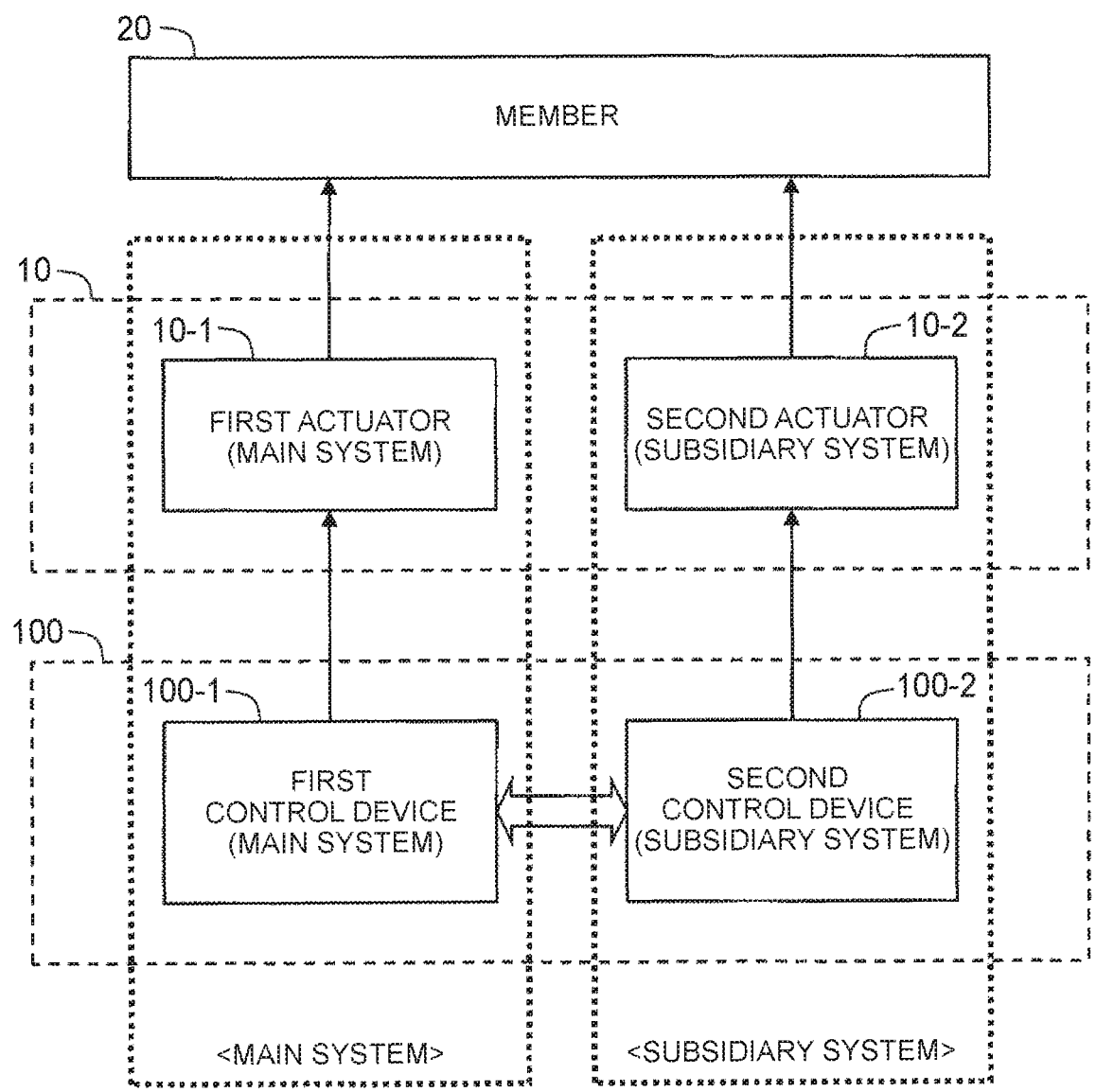
FIG. 2 is a block diagram schematically showing the duplex configuration of the steering control system according to the first embodiment of the disclosure.

FIG. 2 is a block diagram schematically showing the duplex configuration (redundant configuration) of the steering control system 1 according to this embodiment. In this embodiment, at least the actuator 10 and the control device 100 have duplex configuration. One set of the duplex configuration will be called "main system", and the other will be called "subsidiary system", for the sake of convenience. The main system and the subsidiary system have the same configuration.

1-2-1. Duplex Configuration of Actuator

As shown in FIG. 2, the actuator 10 has the duplex configuration including a first actuator 10-1 of the main system and a second actuator 10-2 of the subsidiary system. The first actuator 10-1 and the second actuator 10-2 are coupled to the same member 20, and are able to apply force to the same member 20 at the same time.

Various examples of the duplex configuration of the actuator 10 will be described. In the examples that will be described below, the actuator 10 is an electric motor.

Figure 3:
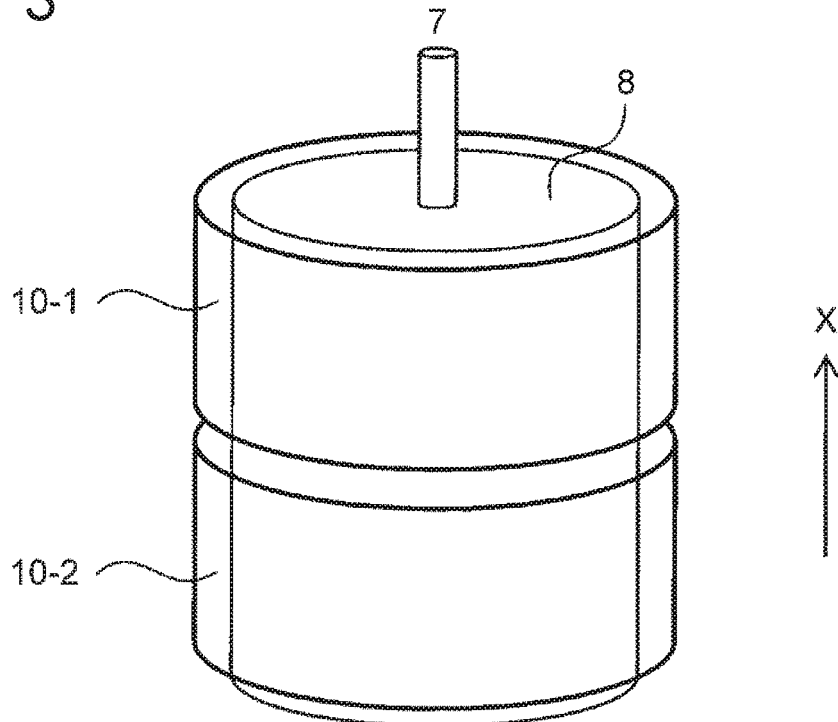
FIG. 3 is a schematic view showing a first example of the duplex configuration of an actuator according to the first embodiment of the disclosure.

FIG. 3 is a schematic view showing a first example of the duplex configuration of the actuator 10. A rotor 8 of the electric motor is connected to an output shaft 7, and rotates about the output shaft 7. In FIG. 3, "X" denotes a direction parallel to the output shaft 7. In the first example, the rotor 8 is common to the first actuator 10-1 and the second actuator 10-2. However, a winding (coil) of the first actuator 10-1 and a winding of the second actuator 10-2 are arranged to be separated in the X direction. Thus, the duplex configuration is established.

Figure 4:
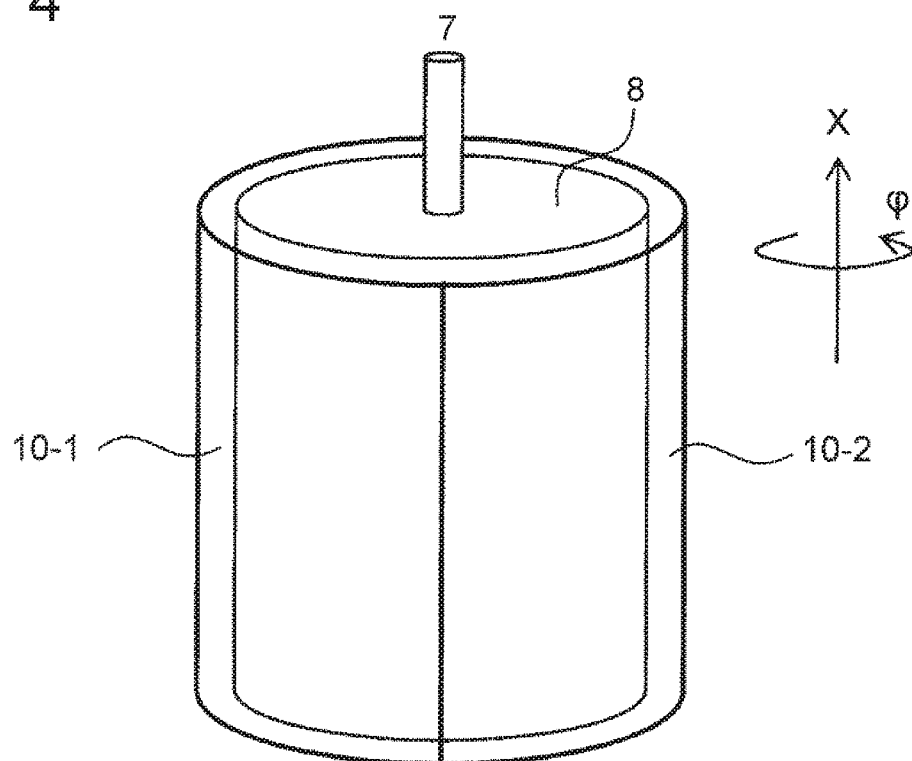
FIG. 4 is a schematic view showing a second example of the duplex configuration of the actuator according to the first embodiment of the disclosure.

FIG. 4 is a schematic view showing a second example of the duplex configuration of the actuator 10. In FIG. 4, "φ" denotes a rotational direction of the rotor 8 of the electric motor. In the second example, the rotor 8 is common to the first actuator 10-1 and the second actuator 10-2. However, the winding of the first actuator 10-1 and the winding of the second actuator 10-2 are arranged to be separated in the φ direction. Thus, the duplex configuration is established.

Figure 5:
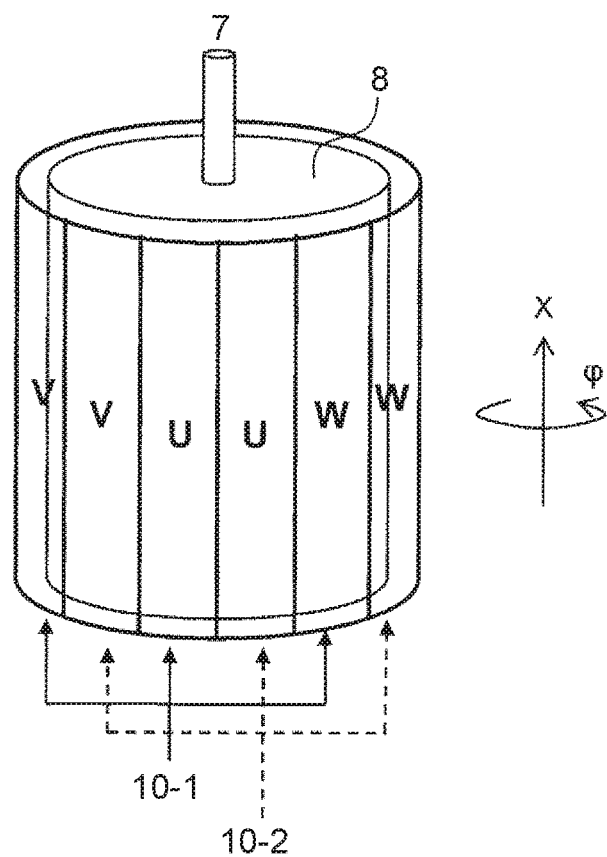
FIG. 5 is a schematic view showing a third example of the duplex configuration of the actuator according to the first embodiment of the disclosure.

FIG. 5 is a schematic view showing a third example of the duplex configuration of the actuator 10. As in the case of the second example, the winding of the first actuator 10-1 and the winding of the second actuator 10-2 are arranged to be separated in the φ direction. In particular, U-phase, V-phase, and W-phase windings of the first actuator 10-1, and U-phase, V-phase, and W-phase windings of the second actuator 10-2 are alternately arranged. Thus, the duplex configuration is established.

Figure 6:
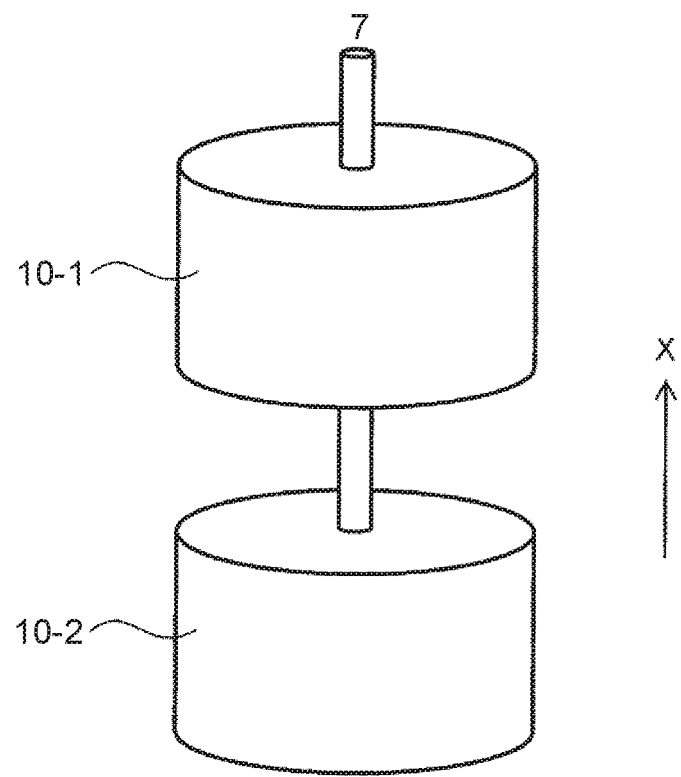
FIG. 6 is a schematic view showing a fourth example of the duplex configuration of the actuator according to the first embodiment of the disclosure.

FIG. 6 is a schematic view showing a fourth example of the duplex configuration of the actuator 10. In the fourth example, the electric motor of the first actuator 10-1 and the electric motor of the second actuator 10-2 are separately provided, and the two different motors are connected to the same shaft (the output shaft 7). Thus, the duplex configuration is established.

1-2-2. Duplex Configuration of Control Device

As shown in FIG. 2, the control device 100 has the duplex configuration including a first control device 100-1 of the main system and a second control device 100-2 of the subsidiary system. Each of the first control device 100-1 and the second control device 100-2 has the same configuration as the control device 100 shown in FIG. 1. The first control device 100-1 of the main system controls the first actuator 10-1 of the main system. The second control device 100-2 of the subsidiary system controls the second actuator 10-2 of the subsidiary system.

Also, the first control device 100-1 and the second control device 100-2 are connected to each other such that they can communicate with each other. The communication may be wire communication, or wireless communication.

Figure 7:
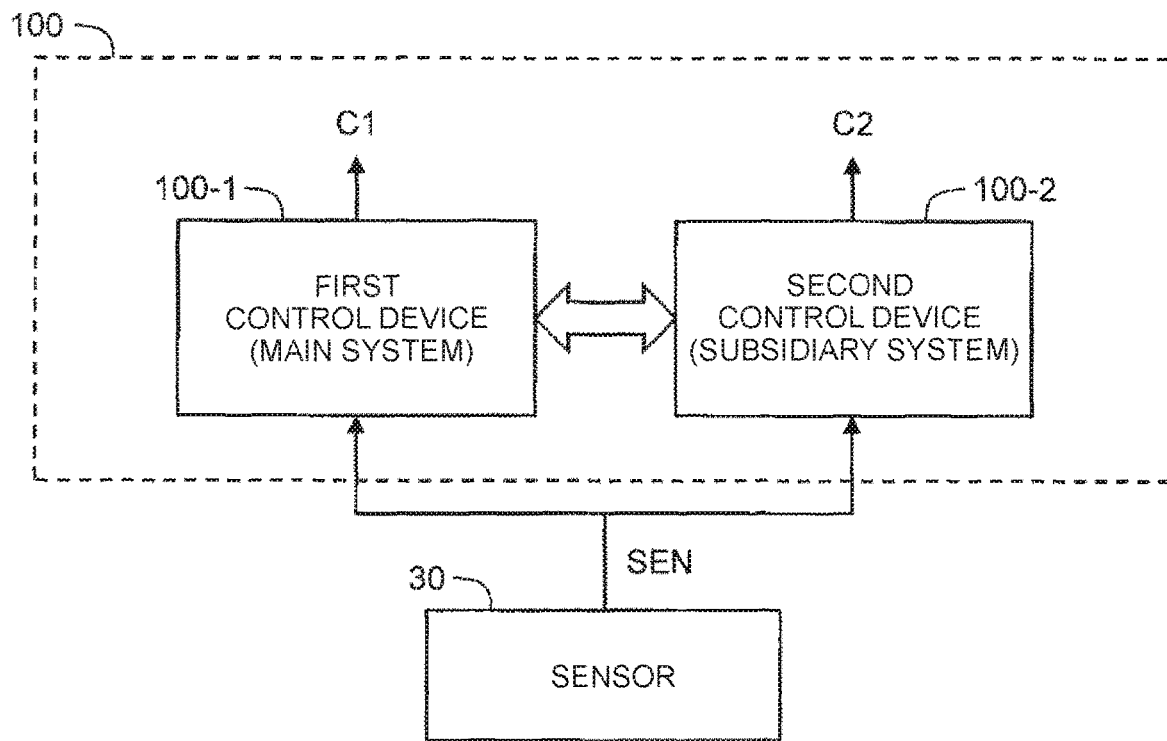
FIG. 7 is a block diagram useful for describing one example of computation of controlled variables by the control device according to the first embodiment of the disclosure.

FIG. 7 is a block diagram useful for describing one example of computation of the controlled variable C by the control device 100. The sensor 30 sends detection information SEN to the first control device 100-1 and the second control device 100-2. The first control device 100-1 and the second control device 100-2 compute the same controlled variable C, based on the same detection information SEN.

In the following description, the controlled variable C computed by the first control device 100-1 will be called "first controlled variable C1", and the controlled variable C computed by the second control device 100-2 will be called "second controlled variable C2", for the sake of convenience.

Figure 8:
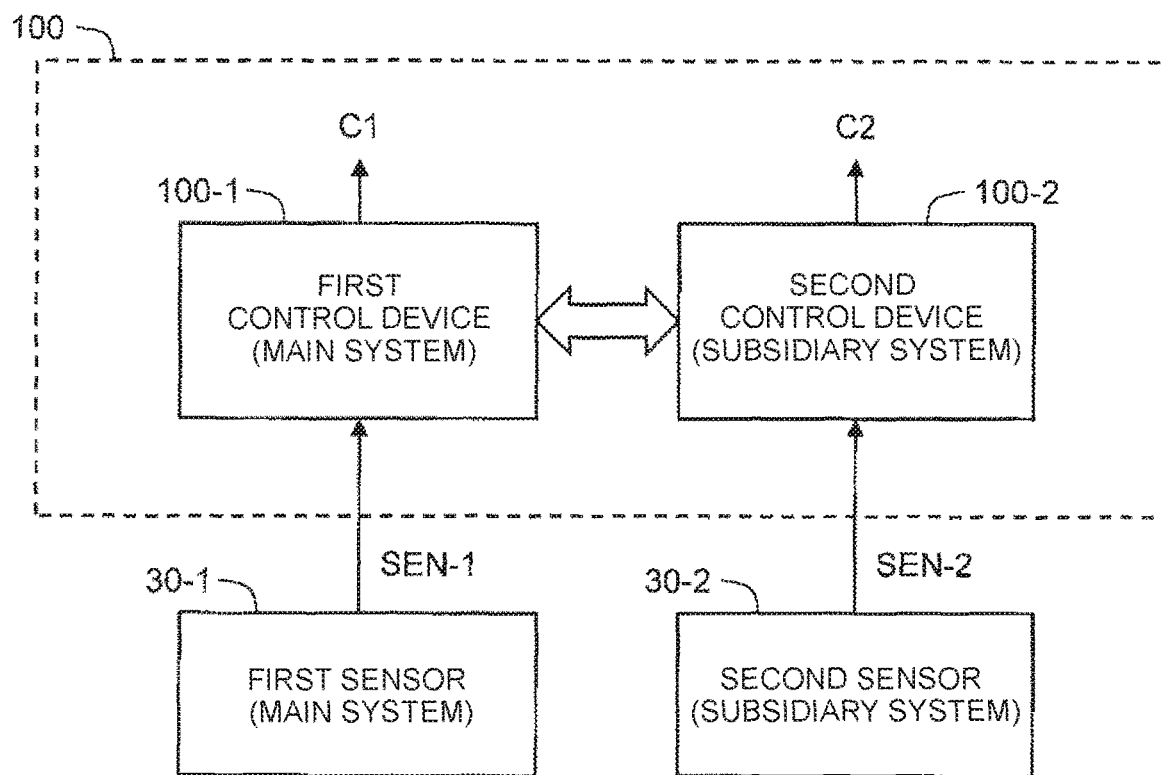
FIG. 8 is a block diagram useful for describing another example of computation of the controlled variables by the control device according to the first embodiment of the disclosure.

FIG. 8 is a block diagram useful for describing another example of computation of the controlled variable C by the control device 100. In the example shown in FIG. 8, the sensor 30 also has duplex configuration. More specifically, the sensor 30 includes a first sensor 30-1 of the main system, and a second sensor 30-2 of the subsidiary system. The first sensor 30-1 and the second sensor 30-2 may be mounted to the first actuator 10-1 and the second actuator 10-2, respectively. The first sensor 30-1 and the second sensor 30-2 obtain the same detection information. The detection information SEN obtained by the first sensor 30-1 will be called "first detection information SEN-1", and the detection information SEN obtained by the second sensor 30-2 will be called "second detection information SEN-2", for the sake of convenience.

The first sensor 30-1 of the main system sends the first detection information SEN-1 to the first control device 100-1 of the main system. The first control device 100-1 computes the first controlled variable C1, based on the first detection information SEN-1. The second sensor 30-2 of the subsidiary system sends the second detection information SEN-2 to the second control device 100-2 of the subsidiary system. The second control device 100-2 computes the second controlled variable C2, based on the second detection information SEN-2.

For example, each of the first controlled variable C1 and the second controlled variable C2 is a target value of feedback control of the actuator 10.

As one example, a target rotational angle of the actuator 10 (electric motor) will be considered. The target rotational angle of the first actuator 10-1 is equal to the target rotational angle of the second actuator 10-2. Accordingly, each of the first controlled variable C1 and the second controlled variable C2 is the same target rotational angle, or an amount (e.g., a motor control signal) corresponding to the target rotational angle.

As another example, target torque of the actuator 10 as a whole will be considered. The target torque of the first actuator 10-1 is a half of the target torque of the actuator 10 as a whole. Similarly, the target torque of the second actuator 10-2 is a half of the target torque of the actuator 10 as a whole. Accordingly, each of the first controlled variable C1 and the second controlled variable C2 is a half of the target torque of the actuator 10 as a whole, or an amount (e.g., target current) corresponding to the half of the target torque.

In some embodiments, the first controlled variable C1 and the second controlled variable C2 have the same magnitude or value. In reality, a minute difference may arise between the first controlled variable C1 and the second controlled variable C2. For example, in the case of the example shown in FIG. 8, a minute difference between the first detection information SEN-1 and the second detection information SEN-2 may cause a minute difference between the first controlled variable C1 and the second controlled variable C2. Causes of the minute difference between the first detection information SEN-1 and the second detection information SEN-2 include sensor detection noise, manufacturing variations between the first sensor 30-1 and the second sensor 30-2, and so forth. In the case of the example shown in FIG. 7, too, noise during communication of the detection information SEN, manufacturing variations between the first control device 100-1 and the second control device 100-2, etc., may cause the minute difference.

1-3. Operating Mode of Control Device

Next, operation of the control device 100 according to this embodiment will be described. According to this embodiment, there are two or more operating modes of the control device 100. More specifically, the operating modes of the control device 100 include at least "normal mode" and "independent mode".

1-3-1. Normal Mode

Figure 9:
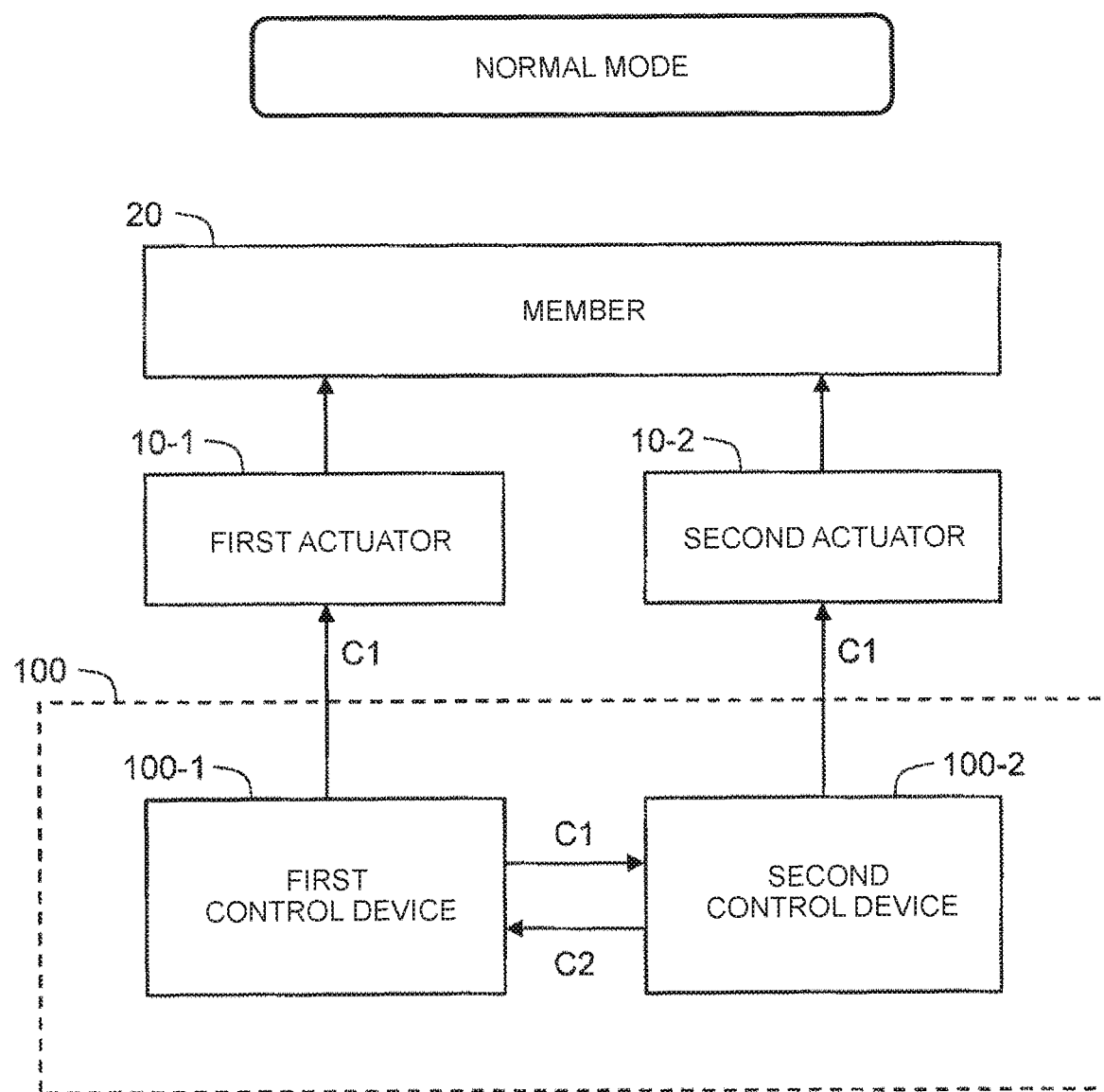
FIG. 9 is a block diagram useful for describing a normal mode of the control device according to the first embodiment of the disclosure.

FIG. 9 is a block diagram useful for describing the normal mode of the control device 100. In the normal mode, the first control device 100-1 and the second control device 100-2 communicate with each other, and operate in synchronization with each other. As described above, the first control device 100-1 and the second control device 100-2 compute the same controlled variable C, as the first controlled variable C1 and the second controlled variable C2, respectively (see FIG. 7, and FIG. 8).

However, a minute difference may arise between the first controlled variable C1 and the second controlled variable C2, due to manufacturing variations, noise, etc., as described above. Accordingly, when the first actuator 10-1 is controlled with the first controlled variable C1, and the second actuator 10-2 is controlled with the second controlled variable C2, noise and vibration may be generated in the actuator 10.

Thus, in the normal mode, the control device 100 controls both the first actuator 10-1 and the second actuator 10-2 according to the first controlled variable C1 of the main system, so as to curb noise and vibration. In other words, the control device 100 controls both the first actuator 10-1 and the second actuator 10-2, without using the second controlled variable C2.

More specifically, the first control device 100-1 controls the first actuator 10-1 according to the first controlled variable C1 computed by itself. Also, the first control device 100-1 sends the first controlled variable C1 to the second control device 100-2. The second control device 100-2 receives the first controlled variable C1 from the first control device 100-1, and controls the second actuator 10-2 according to the received first controlled variable C1. Since the first actuator 10-1 and the second actuator 10-2 are controlled according to the first controlled variable C1, noise and vibration are less likely or unlikely to be generated.

1-3-2. Independent Mode

Figure 10:
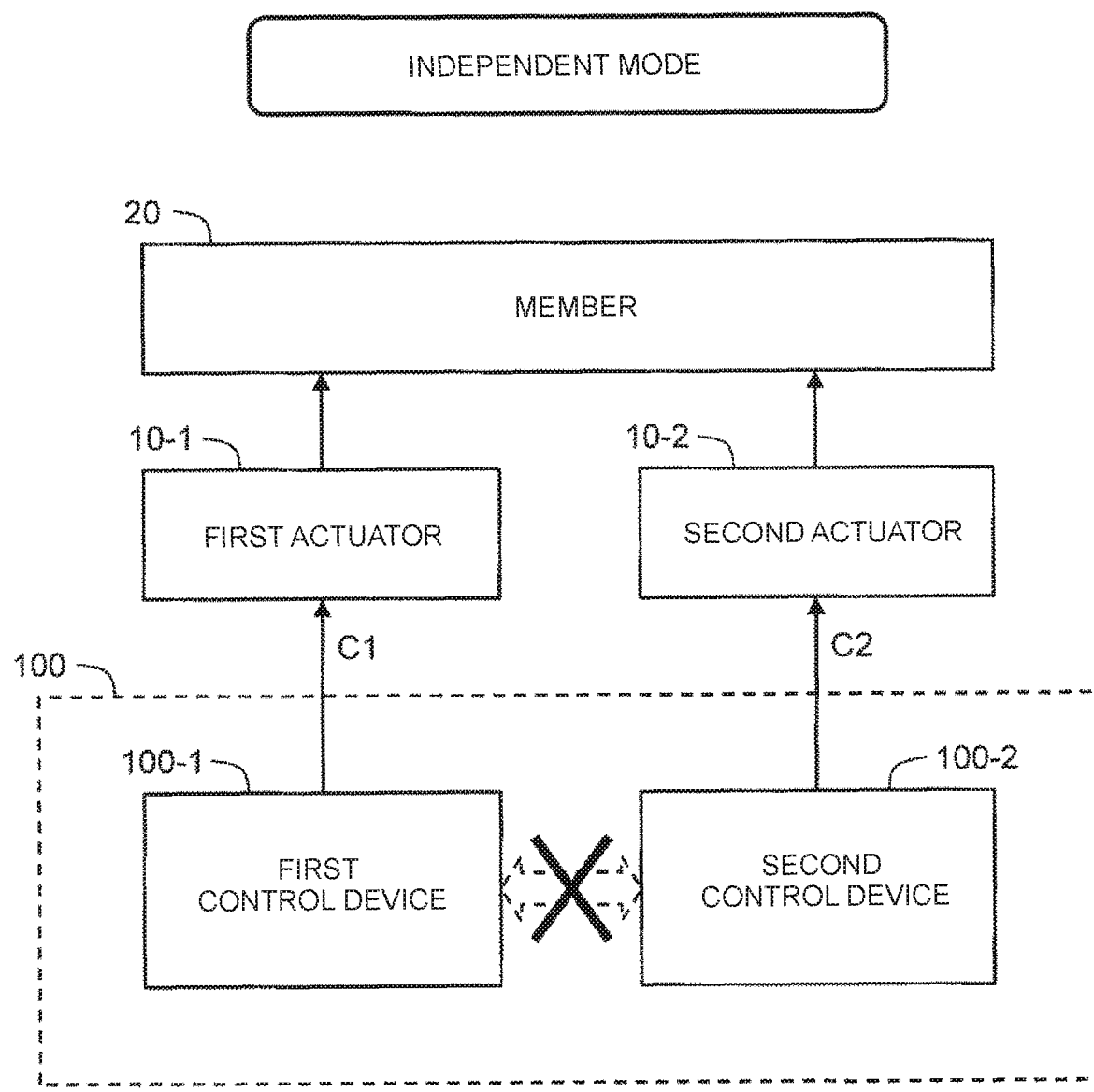
FIG. 10 is a block diagram useful for describing an independent mode of the control device according to the first embodiment of the disclosure.

FIG. 10 is a block diagram useful for describing the independent mode of the control device 100. In the independent mode, the control device 100 blocks communications between the first control device 100-1 and the second control device 100-2. The first control device 100-1 and the second control device 100-2 operate independently of each other, without communicating with each other.

The first control device 100-1 controls the first actuator 10-1 according to the computed first controlled variable C1. At the same time, the second control device 100-2 controls the second actuator 10-2 according to the computed second controlled variable C2. In other words, the first control device 100-1 and the second control device 100-2 control the first actuator 10-1 and the second actuator 10-2 independently of each other. The usage and significance of the independent mode will be described later.

1-3-3. Backup Mode

Each of the first control device 100-1 and the second control device 100-2 has a self-diagnosis function (self-monitoring function) of detecting an abnormality in itself. The self-diagnosis function is a general function installed in a microcomputer, and its detailed description will not be provided. When occurrence of an abnormality in the i-th control device 100-$i$ ($i=1$ or 2) is confirmed through the self-diagnosis function, the i-th control device 100-$i$ stops operating.

When occurrence of an abnormality in one of the first control device 100-1 and the second control device 100-2 is confirmed through the self-diagnosis function, the control device 100 switches the operating mode to the "backup mode". In the backup mode, the other of the first control device 100-1 and the second control device 100-2 controls the actuator 10.

Figure 11:
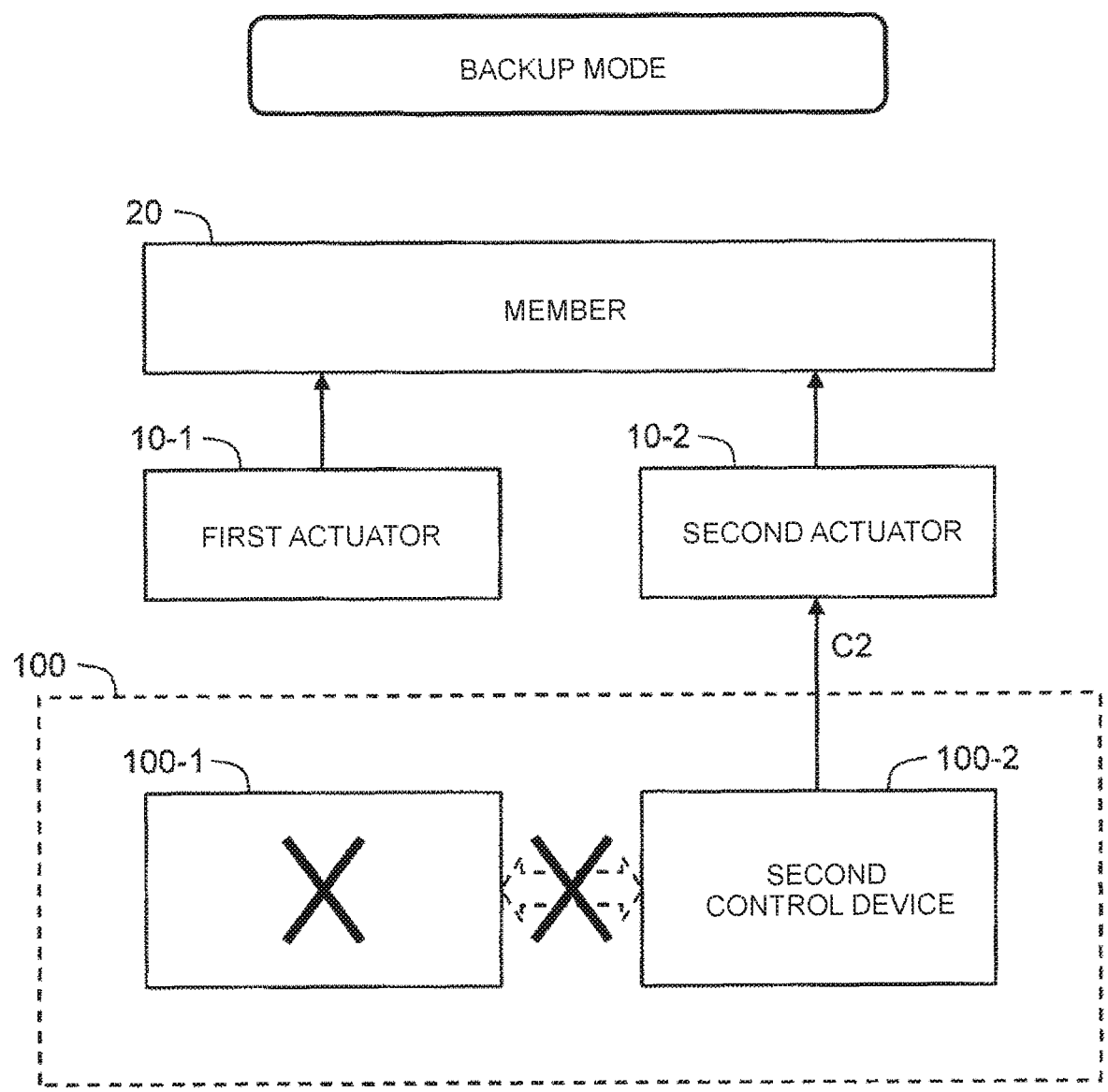
FIG. 11 is a block diagram useful for describing a backup mode of the control device according to the first embodiment of the disclosure.

FIG. 11 is a block diagram useful for describing the backup mode of the control device 100. As one example, the case where an abnormality occurs in the first control device 100-1 of the main system will be considered. When occurrence of the abnormality is confirmed through the self-diagnosis function, the first control device 100-1 outputs an error signal, and stops operating. The second control device 100-2 of the subsidiary system switches the operating mode to the backup mode, in response to the error signal. Then, the second control device 100-2 controls the second actuator 10-2, according to the second controlled variable C2.

1-4. Abnormality Sign and Independent Mode

During the normal mode, an abnormality (failure) may occur in the first control device 100-1 or the second control device 100-2. In particular, when an abnormality occurs in the first control device 100-1 of the main system, the first controlled variable C1 computed by the first control device 100-1 may become an erroneous value (abnormal value). When the first controlled variable C1 becomes an erroneous value, the actuator 10 controlled according to the first controlled variable C1 delivers erroneous force to the member 20. It is undesirable in terms of vehicle traveling that erroneous force is applied to the member 20 associated with steering, since this makes steering unstable. Also, the driver of the vehicle may feel strange or uncomfortable about steering.

Thus, this embodiment provides a technology that can promptly curb an influence of erroneous output of the actuator 10 on the member 20 when an abnormality occurs in the first control device 100-1. To this end, it is initially necessary to detect occurrence of an abnormality during the normal mode.

For example, it is considered to use the self-diagnosis function as described above. However, it requires a certain length of time (e.g., several dozens of milliseconds) to confirm occurrence of an abnormality through the self-diagnosis function. Accordingly, when an abnormality occurs in the first control device 100-1, there is a certain period of time from occurrence of the abnormality to stop of operation of the first control device 100-1. During this period, erroneous output of the actuator 10 continues. Even if the erroneous output continues for several dozens of milliseconds, it is undesirable in terms of vehicle traveling that largely erroneous force is kept applied to the member 20, such as a the steering wheel or wheels.

Thus, in this embodiment, "abnormality sign" in the control device 100 is focused on.

1-4-1. Detection of Abnormality Sign

First Example of Abnormality Sign

When "discrepancy" arises between the first controlled variable C1 computed by the first control device 100-1 and the second controlled variable C2 computed by the second control device 100-2, an abnormality is highly likely to occur in the first control device 100-1 or the second control device 100-2. Thus, the presence of the discrepancy between the first controlled variable C1 and the second controlled variable C2 is recognized as "abnormality sign".

Here, the "discrepancy" is caused by an abnormality in the first control device 100-1 or the second control device 100-2, and is significantly larger than the above-mentioned minute difference due to manufacturing variations or noise. When a difference between the first controlled variable C1 and the second controlled variable C2 is equal to or larger than a threshold value, it is determined that there is "discrepancy" between the first controlled variable C1 and the second controlled variable C2.

During the normal mode, the first control device 100-1 and the second control device 100-2 send and receive the respectively computed controlled variables C (the first controlled variable C1, the second controlled variable C2) to and from each other, via communications (see FIG. 9). Namely, the first control device 100-1 sends the computed first controlled variable C1 to the second control device 100-2. The second control device 100-2 receives the first controlled variable C1 from the first control device 100-1. Also, the second control device 100-2 sends the computed second controlled variable C2 to the first control device 100-1. The first control device 100-1 receives the second controlled variable C2 from the second control device 100-2.

The first control device 100-1 compares the first controlled variable C1 computed by itself, with the second controlled variable C2 received from the second control device 100-2, so as to determine whether there is a discrepancy between the first controlled variable C1 and the second controlled variable C2. When a difference between the first controlled variable C1 and the second controlled variable C2 is equal to or larger than the threshold value, the first control device 100-1 determines that there is the discrepancy between the first controlled variable C1 and the second controlled variable C2.

Similarly, the second control device 100-2 compares the second controlled variable C2 computed by itself, with the first controlled variable C1 received from the first control device 100-1, so as to determine whether there is a discrepancy between the first controlled variable C1 and the second controlled variable C2. When a difference between the first controlled variable C1 and the second controlled variable C2 is equal to or larger than the threshold value, the second control device 100-2 determines that there is the discrepancy between the first controlled variable C1 and the second controlled variable C2.

Second Example of Abnormality Sign

As another example, occurrence of an abnormality in communications between the first control device 100-1 and the second control device 100-2 may be recognized as "abnormality sign". This is because the first control device 100-1 or the second control device 100-2 may malfunction when such a communication abnormality occurs.

For example, the first control device 100-1 generates an error-detecting code, such as checksum, with regard to information of the first controlled variable C1. Then, the first control device 100-1 sends the first controlled variable C1 and the error-detecting code, which are associated with each other, to the second control device 100-2. The second control device 100-2 determines whether the information of the first controlled variable C1 has changed during communication, based on the received first controlled variable C1 and error-detecting code. When the information of the first controlled variable C1 has changed during communication, the second control device 100-2 determines that a communication abnormality occurred.

Similarly, the second control device 100-2 calculates an error-detecting code, such as checksum, with regard to information of the second controlled variable C2. Then, the second control device 100-2 sends the second controlled variable C2 and the error-detecting code, which are associated with each other, to the first control device 100-1. The first control device 100-1 determines whether the information of the second controlled variable C2 has changed during communication, based on the received second controlled variable C2 and error-detecting code. When the information of the second controlled variable C2 has changed during communication, the first control device 100-1 determines that a communication abnormality occurred.

Also, when the first control device 100-1 does not receive the second controlled variable C2 from the second control device 100-2 for a given period of time, it may determine that a communication abnormality occurred. Similarly, when the second control device 100-2 does not receive the first controlled variable C1 from the first control device 100-1 for a given period of time, it may determine that a communication abnormality occurred.

1-4-2. Switching from Normal Mode to Independent Mode

When there is a discrepancy between the first controlled variable C1 and the second controlled variable C2, or there is an abnormality in communications between the first control device 100-1 and the second control device 100-2, the control device 100 detects (recognizes) it as an abnormality sign. In this stage, which of the first control device 100-1 and the second control device 100-2 suffers the abnormality has not been confirmed. However, upon detection of the abnormality sign, the control device 100 immediately switches the operating mode from the normal mode to the independent mode.

More specifically, one of the first control device 100-1 and the second control device 100-2 detects an abnormality sign. The one that detects the abnormality sign will be called "detection control device 100-A". The other of the first control device 100-1 and the second control device 100-2 will be called "notified control device 100-B".

The detection control device 100-A switches the operating mode thereof from the normal mode to the independent mode, and starts operating in the independent mode. Further, the detection control device 100-A notifies the notified control device 100-B of switching from the normal mode to the independent mode. Then, the detection control device 100-A blocks communication with the notified control device 100-B.

The notified control device 100-B receives a switching notification from the detection control device 100-A. The notified control device 100-B switches the operating mode thereof from the normal mode to the independent mode, in response to the switching notification, and starts operating in the independent mode. Also, the notified control device 100-B blocks communication with the detection control device 100-A.

Typically, both of the first control device 100-1 and the second control device 100-2 function as the detection control device 100-A. However, only one of the first control device 100-1 and the second control device 100-2 may function as the detection control device 100-A.

1-4-3. Effect of Independent Mode

The case where an abnormality occurs in the first control device 100-1 of the main system, and the first controlled variable C1 becomes an erroneous value (abnormal value) will be considered. The second controlled variable C2 computed by the second control device 100-2 is supposed to remain correct.

Figure 12:
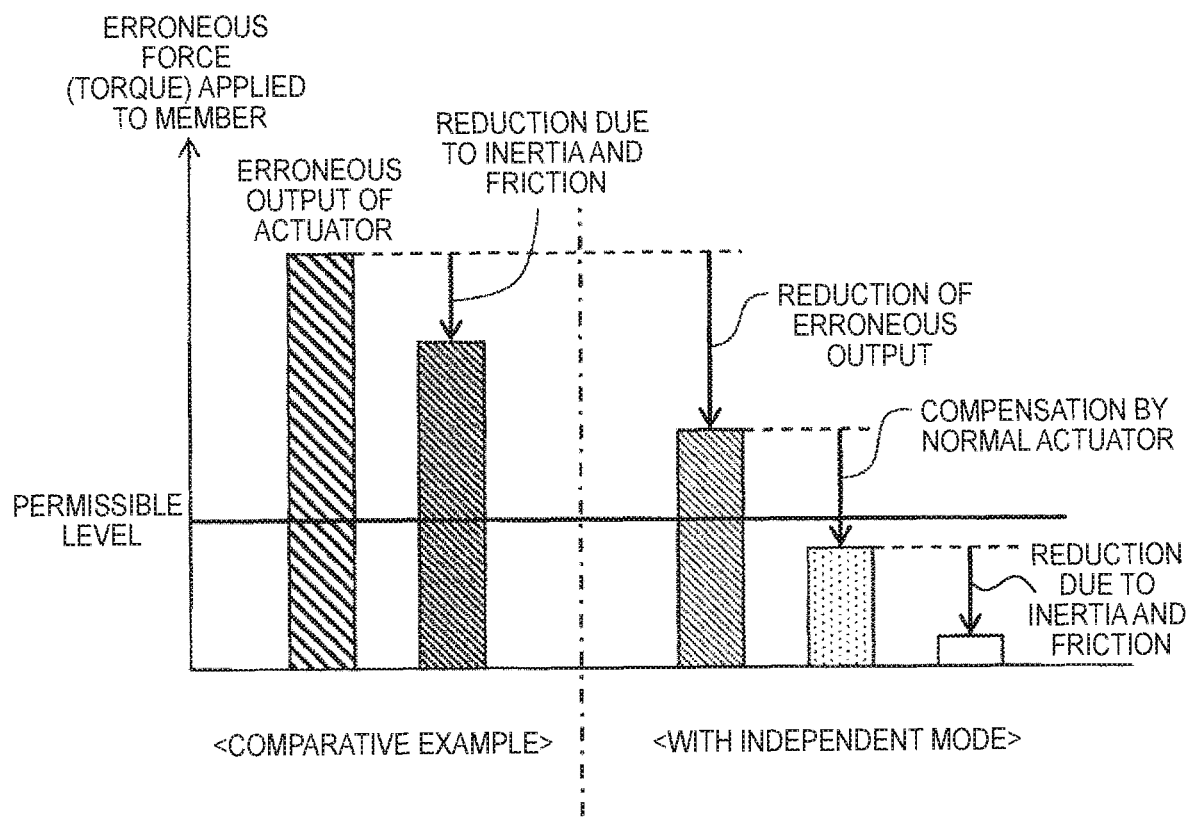
FIG. 12 is a schematic view useful for describing an effect of the independent mode according to the first embodiment of the disclosure.

FIG. 12 is a schematic view useful for describing the effect of the independent mode. The vertical axis indicates erroneous force (or torque) applied to the member 20. The permissible level is the largest erroneous force that can be permitted. For example, when the member 20 is the steering wheel, the permissible level represents erroneous torque small enough to enable the driver to hold the steering wheel immediately.

Initially, the case where there is no independent mode will be considered, as a comparative example. An abnormality occurs in the first control device 100-1, and both the first actuator 10-1 and the second actuator 10-2 are controlled according to the erroneous first controlled variable C1. As a result, both the first actuator 10-1 and the second actuator 10-2 generate erroneous force. Due to the erroneous outputs (erroneous controlled variable) of both of the first actuator 10-1 and the second actuator 10-2, large erroneous force is applied to the member 20. Even where reduction of the force caused by the inertia and friction is taken into consideration, large erroneous force that exceeds the permissible level is applied to the member 20.

On the other hand, according to this embodiment, the first actuator 10-1 is controlled according to the erroneous first controlled variable C1, but the second actuator 10-2 is controlled according to the correct second controlled variable C2. Accordingly, at least the second actuator 10-2 generates correct force. As a result, the erroneous output (erroneous controlled variable) of the actuator 10 as a whole is reduced to be smaller than that in the case of the comparative example.

Further, the following effect is obtained, since the actuator 10 has the duplex configuration.

The first actuator 10-1 and the second actuator 10-2 are coupled to the same member 20, and force is applied to the same member 20 at the same time. Even when the first actuator 10-1 attempts to move the member 20 with erroneous force, the second actuator 10-2 moves the member 20 with correct force at the same time. For example, even when the first actuator 10-1 attempts to move the member 20 strongly, the member 20 does not actually move as intended. In this case, the correct force applied from the normal second actuator 10-2 functions as a physical "brake" against the erroneous force. Namely, the normal second actuator 10-2 functions to compensate for the erroneous output of the first actuator 10-1. As a result, an influence of the erroneous output of the actuator 10 on the member 20 is curbed (alleviated).

Typically, control (typically, feedback control) of the second actuator 10-2 by the normal second control device 100-2 is stronger than control of the first actuator 10-1 by the abnormal first control device 100-1. In this case, movement of the member 20 is mainly controlled by the correct force applied from the second actuator 10-2. As a result, the influence of the erroneous output of the actuator 10 on the member 20 is further curbed.

Thus, in this embodiment, the erroneous output of the actuator 10 as a whole is reduced to be smaller than that of the comparative example. Further, the normal second actuator 10-2 functions to compensate for the erroneous output of the first actuator 10-1. With the two-stage operation, erroneous force applied to the member 20 is sufficiently reduced, as shown in FIG. 12. As a result, steering, or vehicle traveling, is stabilized. Also, the driver is less likely or unlikely to feel strange or uncomfortable about steering and vehicle traveling.

Even when an abnormality occurs in the second control device 100-2 of the subsidiary system, an effect of compensating for erroneous output of the second actuator 10-2 is obtained from the normal first actuator 10-1.

Figure 13:
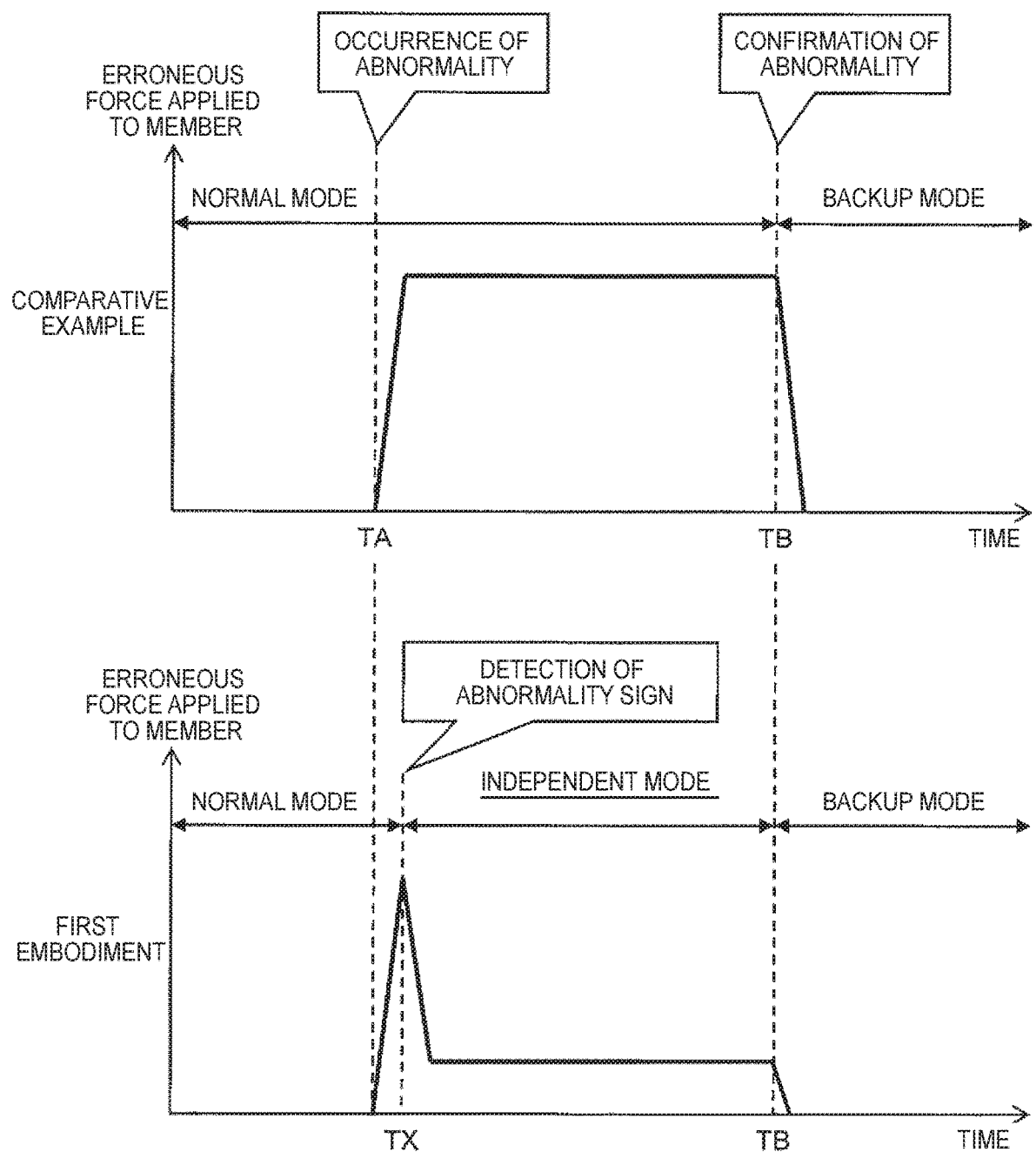
FIG. 13 is a timing chart useful for describing an effect of the independent mode according to the first embodiment of the disclosure.

Referring next to FIG. 13, the relationship between the independent mode and the backup mode will be described. In the graph shown in FIG. 13, the horizontal axis indicates time, and the vertical axis indicates erroneous force applied to the member 20.

Initially, the control device 100 operates in the normal mode. At time TA during the normal mode, an abnormality occurs in the first control device 100-1; as a result, erroneous output of the actuator 10 is generated. The first control device 100-1 having the self-diagnosis function determines occurrence of the abnormality. At time TB that is later than time TA, the first control device 100-1 with the self-diagnosis function confirms occurrence of the abnormality. The length of time from time TA to time TB is about several dozens of milliseconds, for example. At time TB, the control device 100 starts the backup mode.

In the normal mode, the first control device 100-1 and the second control device 100-2 send and receive the respectively computed controlled variables C (first controlled variable C1, second controlled variable C2) to and from each other, via communications. When a discrepancy arises between the first controlled variable C1 and the second controlled variable C2, or when an abnormality occurs in communications between the first control device 100-1 and the second control device 100-2, the control device 100 detects it as an abnormality sign. The abnormality sign is detected at a far earlier point in time than confirmation of the abnormality through the self-diagnosis function. As shown in FIG. 13, the abnormality sign is detected at time TX that is far earlier than time TB. The length of time from time TA to time TX is about one millisecond, for example.

At the stage of time TX, it has not been confirmed which of the first control device 100-1 and the second control device 100-2 is involved with the abnormality. However, the control device 100 switches the operating mode from the normal mode to the independent mode, at time TX when the abnormality sign is detected. As a result, the start time of the independent mode is earlier than that of the backup mode.

The upper graph in FIG. 13 shows the case of the comparative example having no independent mode. In the case of the comparative example, large erroneous force is kept applied to the member 20, during a period from time TA to time TB. Even though the period is several dozens of milliseconds, it is undesirable, in terms of vehicle traveling, that large erroneous force is kept applied to the member 20, such as the steering wheels or wheels.

On the other hand, according to this embodiment, the independent mode is started, at the stage of time TX when the abnormality sign is detected. As a result, erroneous force applied to the member 20 is reduced, though the degree of reduction is smaller than that of the backup mode. Accordingly, as shown in FIG. 13, the period in which large erroneous force is applied to the member 20 is significantly shortened as compared with the case of the comparative example.

As described above, according to this embodiment, when an abnormality occurs in the first control device 100-1 of the main system, an influence of erroneous output of the actuator 10 on the member 20 associated with steering can be promptly curbed (alleviated). Namely, the period in which large erroneous force is applied to the member 20 associated with steering is shortened. As a result, steering, or vehicle traveling, is stabilized. Also, the driver is less likely or unlikely to feel strange or uncomfortable about steering and vehicle traveling.

1-5. Processing Flow

Figure 14:
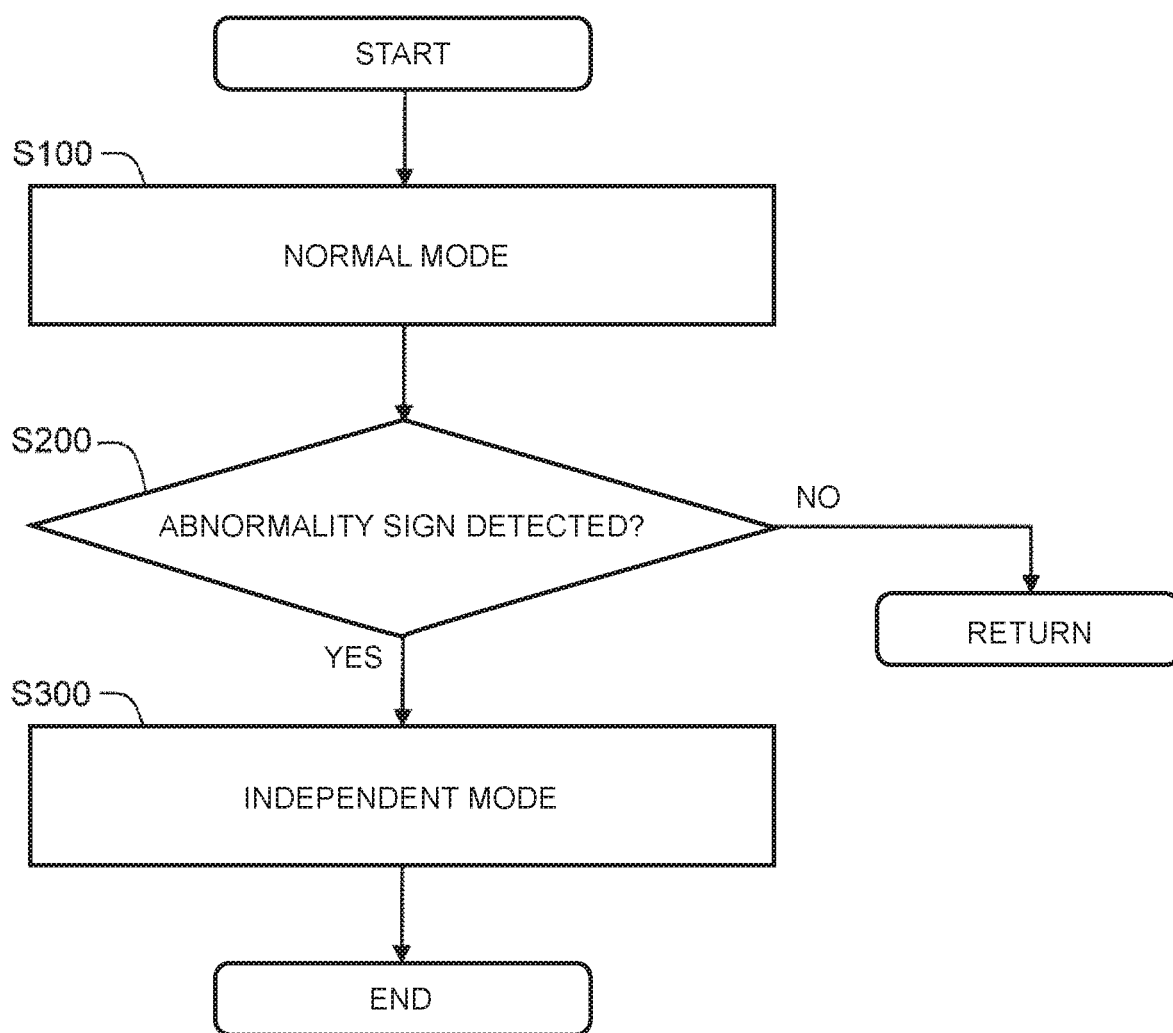
FIG. 14 is a flowchart generally describing processing by the control device according to the first embodiment of the disclosure.

FIG. 14 is a flowchart generally describing processing performed by the control device 100 according to this embodiment.

In step S100, the control device 100 operates in the normal mode (see FIG. 9). The control device 100 controls the first actuator 10-1 and the second actuator 10-2 according to the first controlled variable C1, without using the second controlled variable C2. Also, the first control device 100-1 and the second control device 100-2 send and receive the respectively computed controlled variables C (the first controlled variable C1, the second controlled variable C2) to and from each other, via communications.

In step S200, the control device 100 determines whether there is an abnormality sign. More specifically, the control device 100 determines whether a discrepancy arises between the first controlled variable C1 and the second controlled variable C2, or whether an abnormality occurs in communications between the first control device 100-1 and the second control device 100-2. When an abnormality sign is detected (step S200; YES), the control proceeds to step S300. Otherwise (step S200; NO), the control returns to step S100.

In step S300, the operating mode of the control device 100 is switched from the normal mode to the independent mode. In the independent mode, the first control device 100-1 controls the first actuator 10-1 according to the first controlled variable C1. At the same time, the second control device 100-2 controls the second actuator 10-2 according to the computed second controlled variable C2 (see FIG. 10).

When the control device 100 does not recover from the abnormality, it confirms occurrence of the abnormality through the self-diagnosis function. Once the occurrence of the abnormality is confirmed, the control device 100 operates in the backup mode. The start time of the backup mode is later than the start time of the independent mode. When the control device 100 recovers from the abnormality, the control device 100 resumes communications between the first control device 100-1 and the second control device 100-2, and returns to the normal mode.

1-6. Summary

According to this embodiment, the actuator 10 that applies force to the member 20 associated with steering has the duplex configuration including the first actuator 10-1 of the main system and the second actuator 10-2 of the subsidiary system. The control device 100 that controls the actuator 10 has the duplex configuration including the first control device 100-1 of the main system and the second control device 100-2 of the subsidiary system. The first control device 100-1 and the second control device 100-2 compute the same controlled variable C, as the first controlled variable C1 and the second controlled variable C2, respectively.

In the normal mode, the control device 100 controls both the first actuator 10-1 and the second actuator 10-2, according to the first controlled variable C1 computed by the first control device 100-1 of the main system. Thus, noise and vibration are less likely or unlikely to be generated in the actuator 10.

When an abnormality occurs in the first control device 100-1, the computed first controlled variable C1 may become an erroneous value. When the first controlled variable C1 becomes an erroneous value, the first actuator 10-1 and the second actuator 10-2 generate erroneous force. In view of this situation, the independent mode is provided, in addition to the normal mode.

In the independent mode, the first control device 100-1 controls the first actuator 10-1 according to the first controlled variable C1, and the second control device 100-2 controls the second actuator 10-2 according to the second controlled variable C2. Even when the first controlled variable C1 becomes an erroneous value, the second actuator 10-2 controlled according to the correct second controlled variable C2 generates correct force. Accordingly, switching from the normal mode to the independent mode leads to reduction of erroneous output of the actuator 10 as a whole.

Further, the first actuator 10-1 and the second actuator 10-2 are coupled to the same member 20, and apply force to the same member 20 at the same time. Even when the first actuator 10-1 attempts to move the member 20 with erroneous force, the second actuator 10-2 moves the member 20 with correct force at the same time. Namely, the normal second actuator 10-2 functions to compensate for erroneous output of the first actuator 10-1. Thus, an influence of the erroneous output of the actuator 10 on the member 20 is curbed (alleviated).

Switching from the normal mode to the independent mode is executed in response to detection of "abnormality sign". More specifically, during the normal mode, the first control device 100-1 and the second control device 100-2 send and receive the respectively computed controlled variables C (the first controlled variable C1, the second controlled variable C2) to and from each other via communications. When a discrepancy arises between the first controlled variable C1 and the second controlled variable C2, or an abnormality occurs in communications between the first control device 100-1 and the second control device 100-2, the control device 100 detects it as an abnormality sign. The abnormality sign can be detected earlier than confirmation of occurrence of the abnormality.

Accordingly, the independent mode can be promptly started.

As described above, according to this embodiment, when an abnormality occurs in the first control device 100 of the main system, an influence of erroneous output of the actuator 10 on the member 20 associated with steering can be promptly curbed (alleviated). As a result, steering, or vehicle traveling, is stabilized. Also, the driver is less likely or unlikely to feel strange or uncomfortable about steering and vehicle traveling.

2. Second Embodiment

In a second embodiment, an example of the functional configuration of the control device 100 will be described. Description that overlaps that of the first embodiment will be omitted as appropriate.

Figure 15:
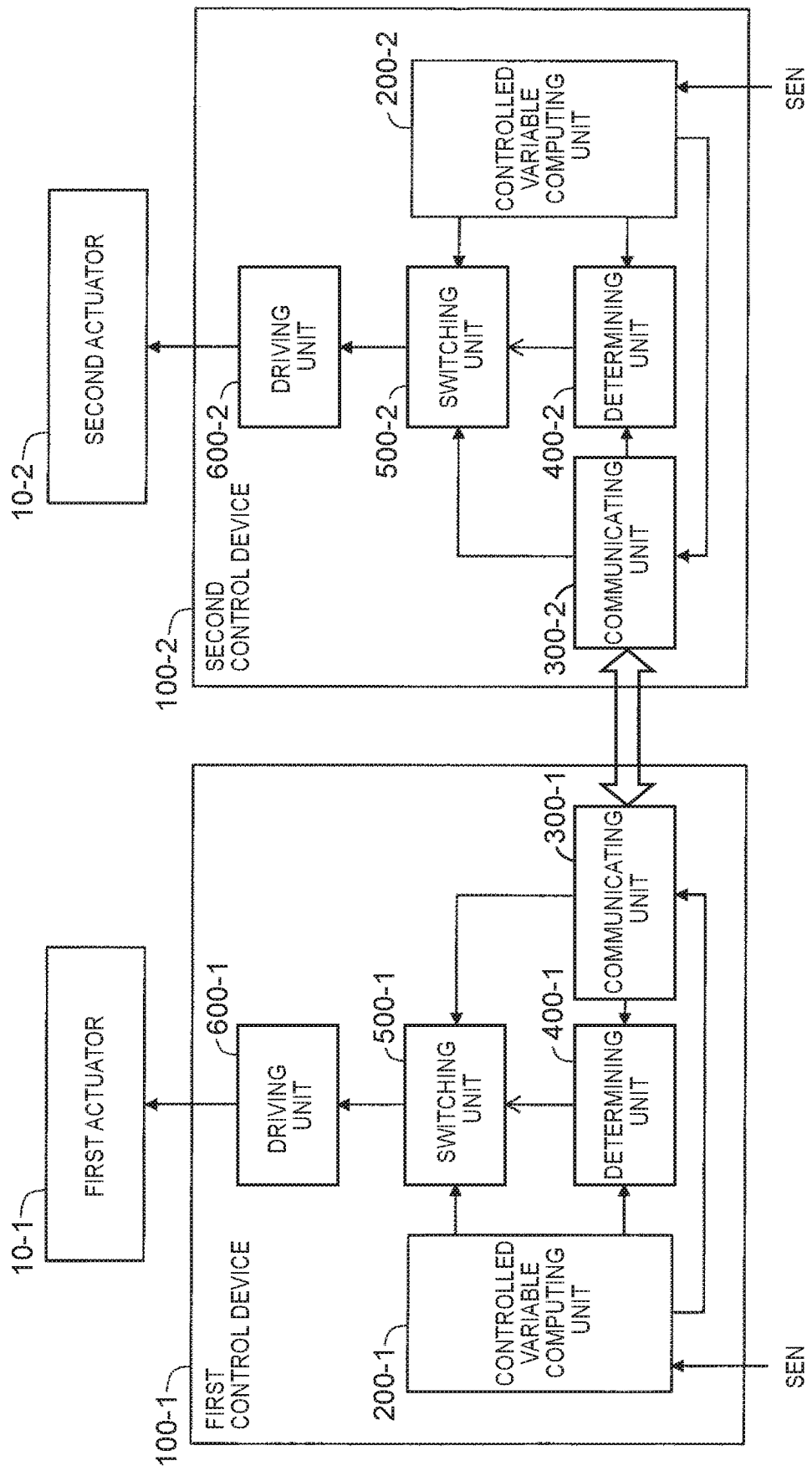
FIG. 15 is a block diagram showing an example of the functional configuration of a control device according to a second embodiment of the disclosure.

FIG. 15 is a block diagram showing an example of the functional configuration of the control device 100. An i-th control device 100-$i$ ($i$=1 or 2) includes a controlled variable computing unit 200-$i$, communicating unit 300-$i$, determining unit 400-$i$, switching unit 500-$i$, and driving unit 600-$i$. The processor 101 of the i-th control device 100-$i$ executes control programs stored in the memory 102, so as to implement the controlled variable computing unit 200-$i$, determining unit 400-$i$, and switching unit 500-$i$. The communicating unit 300-$i$ includes a transmitter, receiver, and communication interface. The driving unit 600-$i$ includes a drive circuit, such as an inverter.

2-1. Normal Mode

Figure 16:
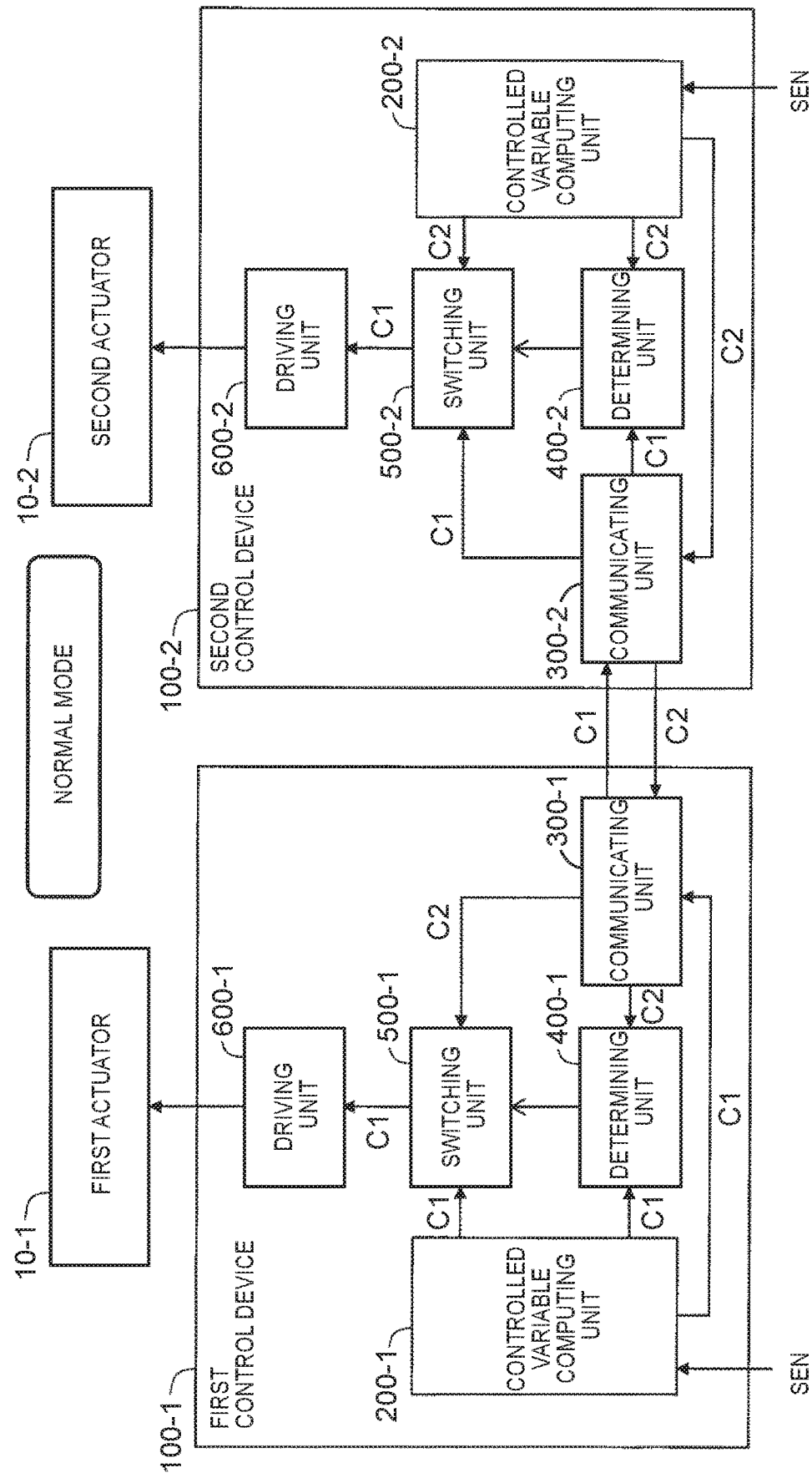
FIG. 16 is a functional block diagram useful for describing a normal mode of the control device according to the second embodiment of the disclosure.

FIG. 16 is a block diagram useful for describing the normal mode according to this embodiment. Initially, the first control device 100-1 will be described.

The controlled variable computing unit 200-1 computes the first controlled variable C1 based on detection information SEN (or first detection information SEN-1). The controlled amount computing unit 200-1 outputs the computed first controlled variable C1 to the communicating unit 300-1, determining unit 400-1, and switching unit 500-1.

The communicating unit 300-1 performs communication with the second control device 100-2. For example, the communicating unit 300-1 sends the first controlled variable C1 to the second control device 100-2. Also, the communicating unit 300-1 receives the second controlled variable C2 transmitted from the second control device 100-2. The communicating unit 300-1 outputs the received second controlled variable C2 to the determining unit 400-1 and the switching unit 500-1.

The determining unit 400-1 determines whether there is an abnormality sign. More specifically, the determining unit 400-1 compares the first controlled variable C1 with the second controlled variable C2, so as to determine whether a discrepancy arises between the first controlled variable C1 and the second controlled variable C2. When a difference between the first controlled variable C1 and the second controlled variable C2 is equal to or larger than a predetermined threshold value, the determining unit 400-1 determines that there is a discrepancy between the first controlled variable C1 and the second controlled variable C2. Also, the determining unit 400-1 determines whether a communication abnormality occurs, based on the second controlled variable C2 received from the second control device 100-2. Then, the determining unit 400-1 outputs a determination result signal indicating the result of determination, to the switching unit 500-1.

The switching unit 500-1 switches the operating mode according to the determination result signal. When the determination result signal does not indicate detection of an abnormality sign, the switching unit 500-1 selects the normal mode. In the normal mode, the switching unit 500-1 outputs the first controlled variable C1 computed by the controlled variable computing unit 200-1, to the driving unit 600-1.

The driving unit 600-1 drives the first actuator 10-1, according to the first controlled variable C1 transmitted from the switching unit 500-1. For example, the driving unit 600-1 generates a current control signal (e.g., PWM control signal) according to the first controlled variable C1, and supplies drive current (e.g., three-phase alternating current) to the first actuator 10-1 according to the current control signal. The first actuator 10-1 is driven with the drive current, and applies force to the member 20.

Operation of the second control device 100-2 is basically similar to operation of the first control device 100-1. In the above description of operation of the first control device 100-1, "the first" is replaced with "the second", "-1" is replaced with "-2", "C1" is replaced with "C2", "the second" is replaced with "the first", "-2" is replaced with "-1", and "C2" is replaced with "C1".

It is, however, to be noted that operation of the switching unit 500-2 of the second control device 100-2 is different from operation of the switching unit 500-1 of the first control device 100-1. In the normal mode, the switching unit 500-2 outputs the first controlled variable C1 received from the first control device 100-1, to the driving unit 600-2. The driving unit 600-2 drives the second actuator 10-2, according to the first controlled variable C1 transmitted from the switching unit 500-2.

Thus, the first control device 100-1 controls the first actuator 10-1 according to the computed first controlled variable C1. On the other hand, the second control device 100-2 controls the second actuator 10-2 according to the first controlled variable C1 received from the first control device 100-1. Namely, in the normal mode, both the first actuator 10-1 and the second actuator 10-2 are controlled according to the first controlled variable C1. Since the first actuator 10-1 and the second actuator 10-2 are controlled according to the first controlled variable C1, noise and vibration are less likely or unlikely to be generated.

2-2. Switching from Normal Mode to Independent Mode

As described above, the switching unit 500-1 of the first control device 100-1 switches the operating mode according to the determination result signal. When the determination result signal indicates detection of an abnormality sign, the switching unit 500-1 switches the operating mode from the normal mode to the independent mode. Also, the switching unit 500-1 notifies the second control device 100-2 of switching from the normal mode to the independent mode, via the communicating unit 300-1. Then, the communicating unit 300-1 blocks communication with the second control device 100-2.

The communicating unit 300-2 of the second control device 100-2 (notified control device 100-B) receives the switching notification from the first control device 100-1 (detection control device 100-A). The communicating unit 300-2 sends the received switching notification to the switching unit 500-2. The switching unit 500-2 switches the operating mode from the normal mode to the independent mode, in response to the switching notification. Then, the communicating unit 300-2 blocks communication with the first control device 100-1.

Similarly, the switching unit 500-2 of the second control device 100-2 switches the operating mode according to the determination result signal. When the determination result signal indicates detection of an abnormality sign, the switching unit 500-2 switches the operating mode from the normal mode to the independent mode. Also, the switching unit 500-2 notifies the first control device 100-1 of switching from the normal mode to the independent mode, via the communicating unit 300-2. Then, the communicating unit 300-2 blocks communication with the first control device 100-1.

The communicating unit 300-1 of the first control device 100-1 (notified control device 100-B) receives the switching notification from the second control device 100-2 (detection control device 100-A). The communicating unit 300-1 sends the received switching notification to the switching unit 500-1. The switching unit 500-1 switches the operating mode from the normal mode to the independent mode, in response to the switching notification. Then, the communicating unit 300-1 blocks communication with the second control device 100-2.

2-3. Independent Mode

Figure 17:
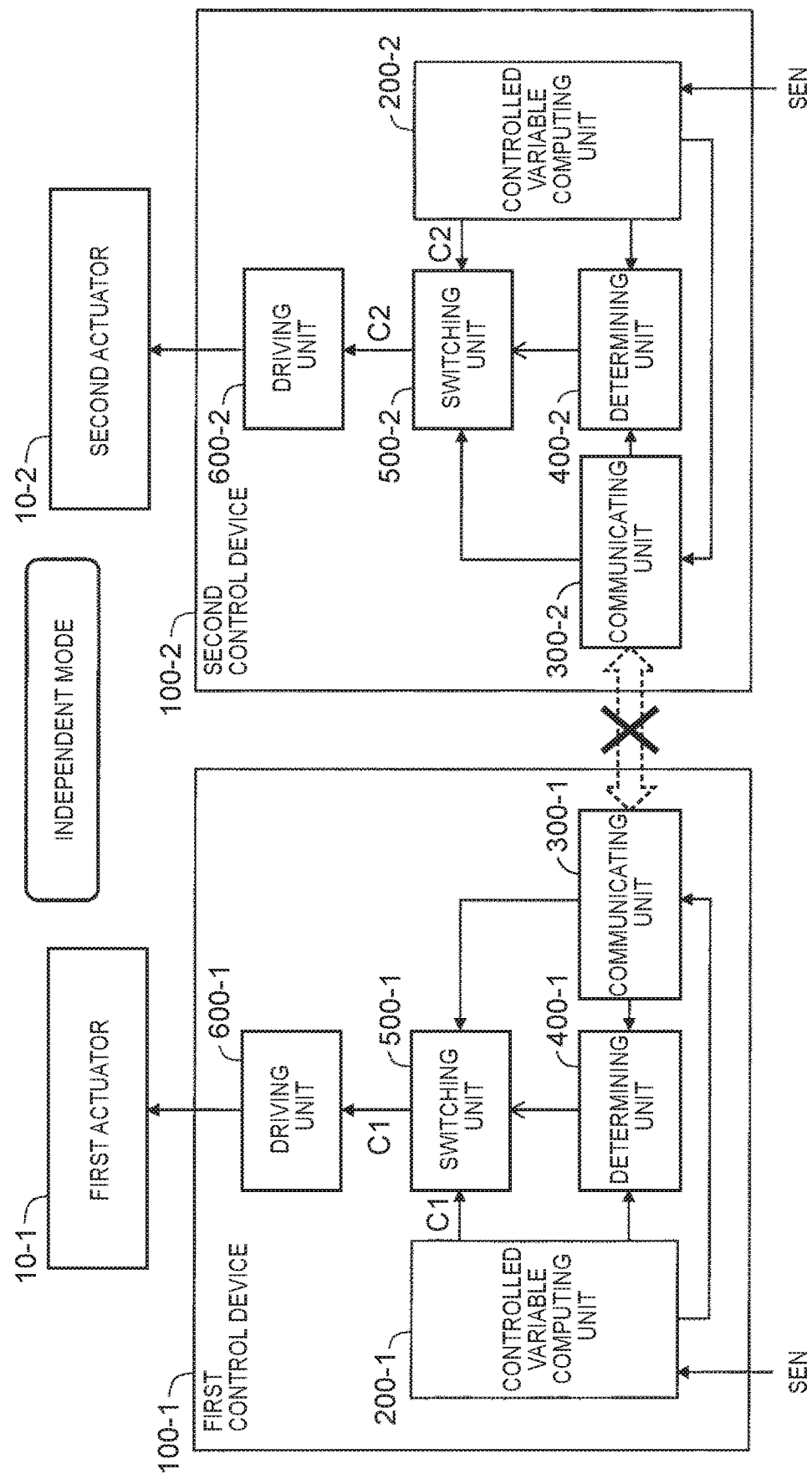
FIG. 17 is a functional block diagram useful for describing an independent mode of the control device according to the second embodiment of the disclosure.

FIG. 17 is a block diagram useful for describing the independent mode according to this embodiment. In the independent mode, the first control device 100-1 and the second control device 100-2 operate independently of each other, without communicating with each other.

More specifically, the switching unit 500-1 of the first control device 100-1 outputs the first controlled variable C1 computed by the controlled variable computing unit 200-1, to the driving unit 600-1. The driving unit 600-1 drives the first actuator 10-1, according to the first controlled variable C1 transmitted from the switching unit 500-1. Thus, the first control device 100-1 controls the first actuator 10-1 according to the first controlled variable C1.

The switching unit 500-2 of the second control device 100-2 outputs the second controlled variable C2 computed by the controlled variable computing unit 200-2, to the driving unit 600-2. The driving unit 600-2 drives the second actuator 10-2, according to the second controlled variable C2 transmitted from the switching unit 500-2. Thus, the second control device 100-2 controls the second actuator 10-2 according to the second controlled variable C2.

2-4. Backup Mode

Figure 18:
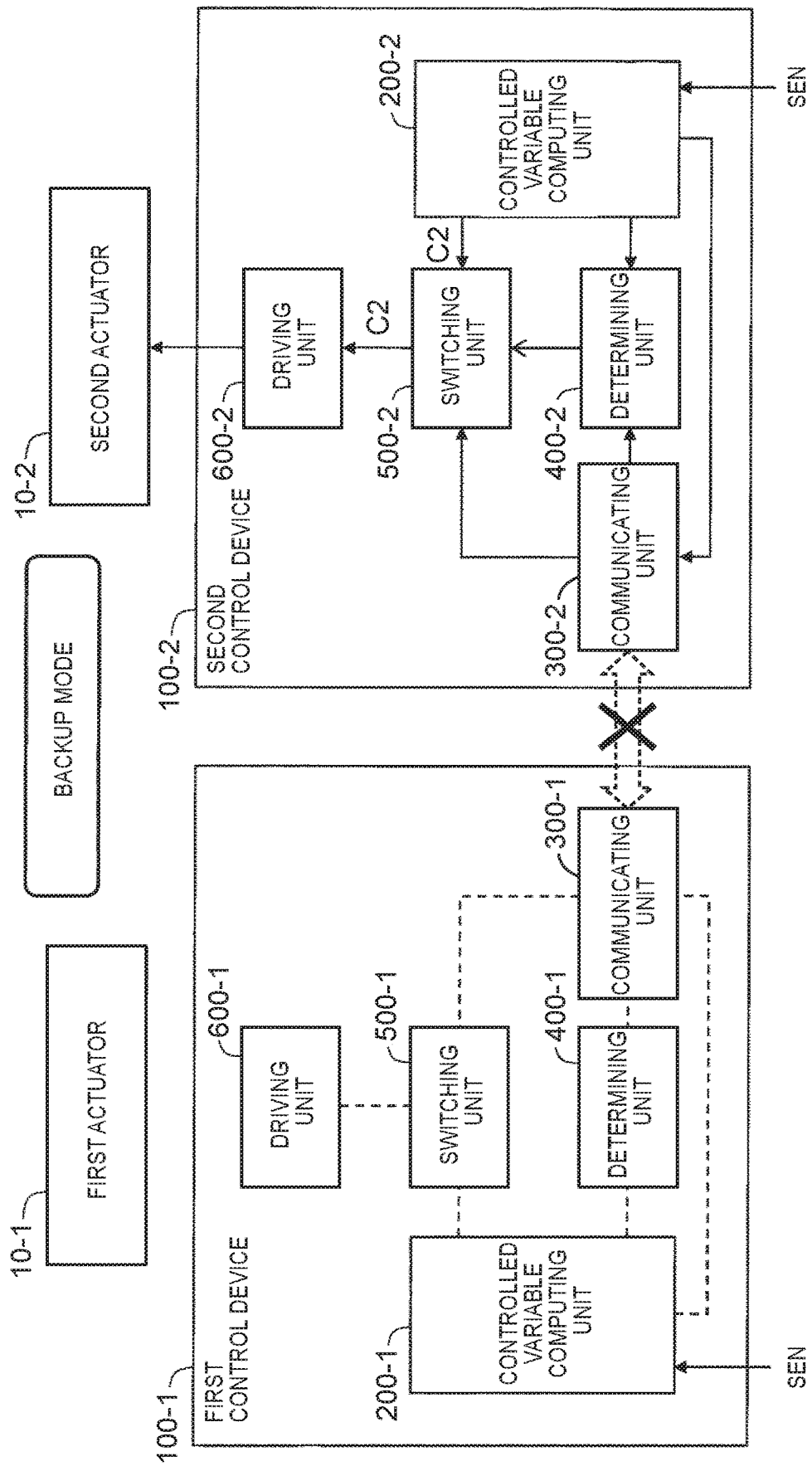
FIG. 18 is a functional block diagram useful for describing a backup mode of the control device according to the second embodiment of the disclosure.

FIG. 18 is a block diagram useful for describing the backup mode according to this embodiment. As one example, the case where an abnormality occurs in the first control device 100 of the main system will be considered. When occurrence of the abnormality is confirmed through the self-diagnosis function, the first control device 100-1 outputs an error signal, and stops operating. The second control device 100-2 of the subsidiary system switches the operating mode to the backup mode, in response to the error signal.

In the backup mode, the switching unit 500-2 of the second control device 100-2 outputs the second controlled variable C2 computed by the controlled variable computing unit 200-2, to the driving unit 600-2. The driving unit 600-2 drives the second actuator 10-2, according to the second controlled variable C2 transmitted from the switching unit 500-2. Thus, the second control device 100-2 controls the second actuator 10-2 according to the second controlled variable C2.

3. Third Embodiment

In a third embodiment, a modified example of the normal mode will be considered. Description that overlaps that of the illustrated embodiments will be omitted as appropriate.

Figure 19:
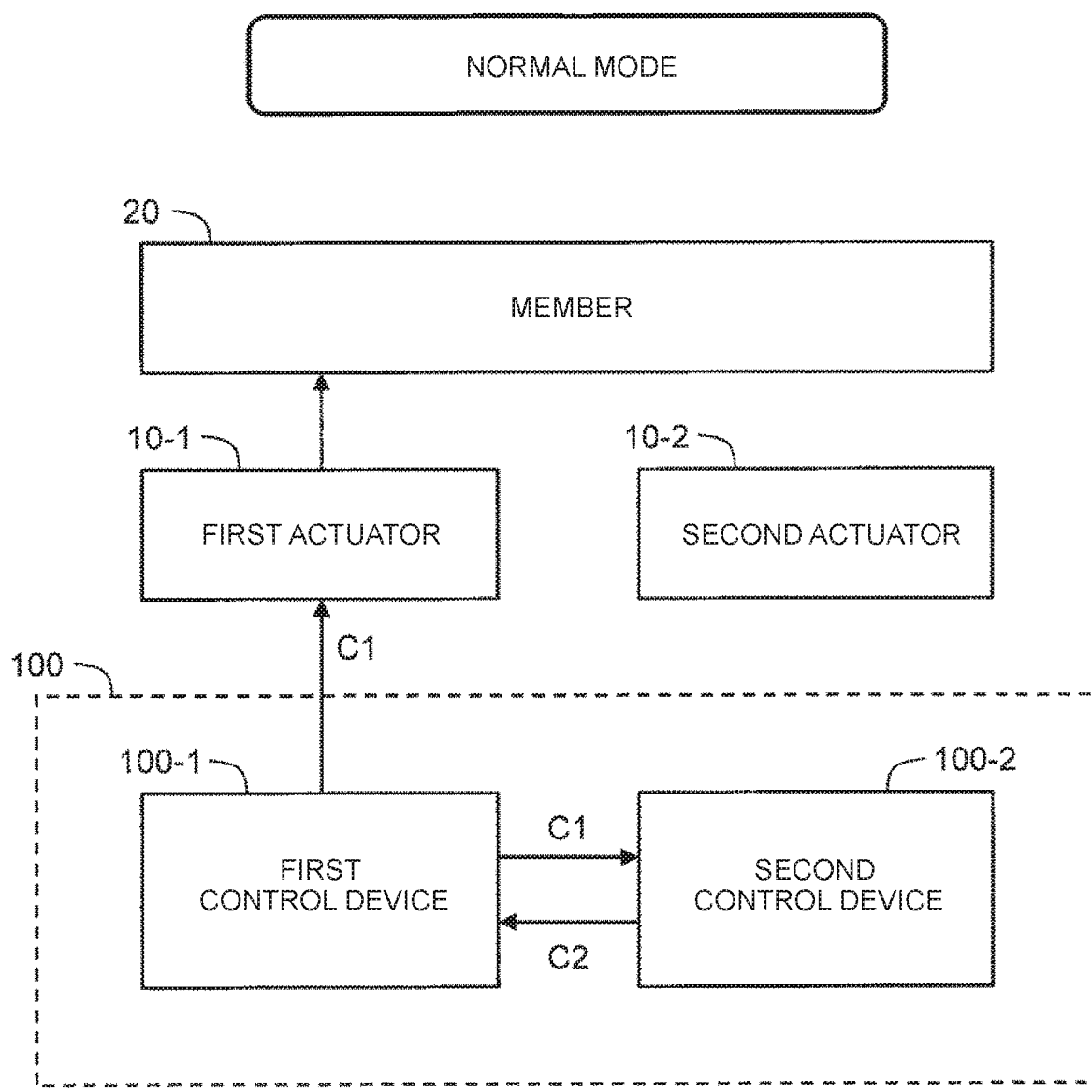
FIG. 19 is a block diagram useful for describing a normal mode of a control device according to a third embodiment of the disclosure.
Figure 20:
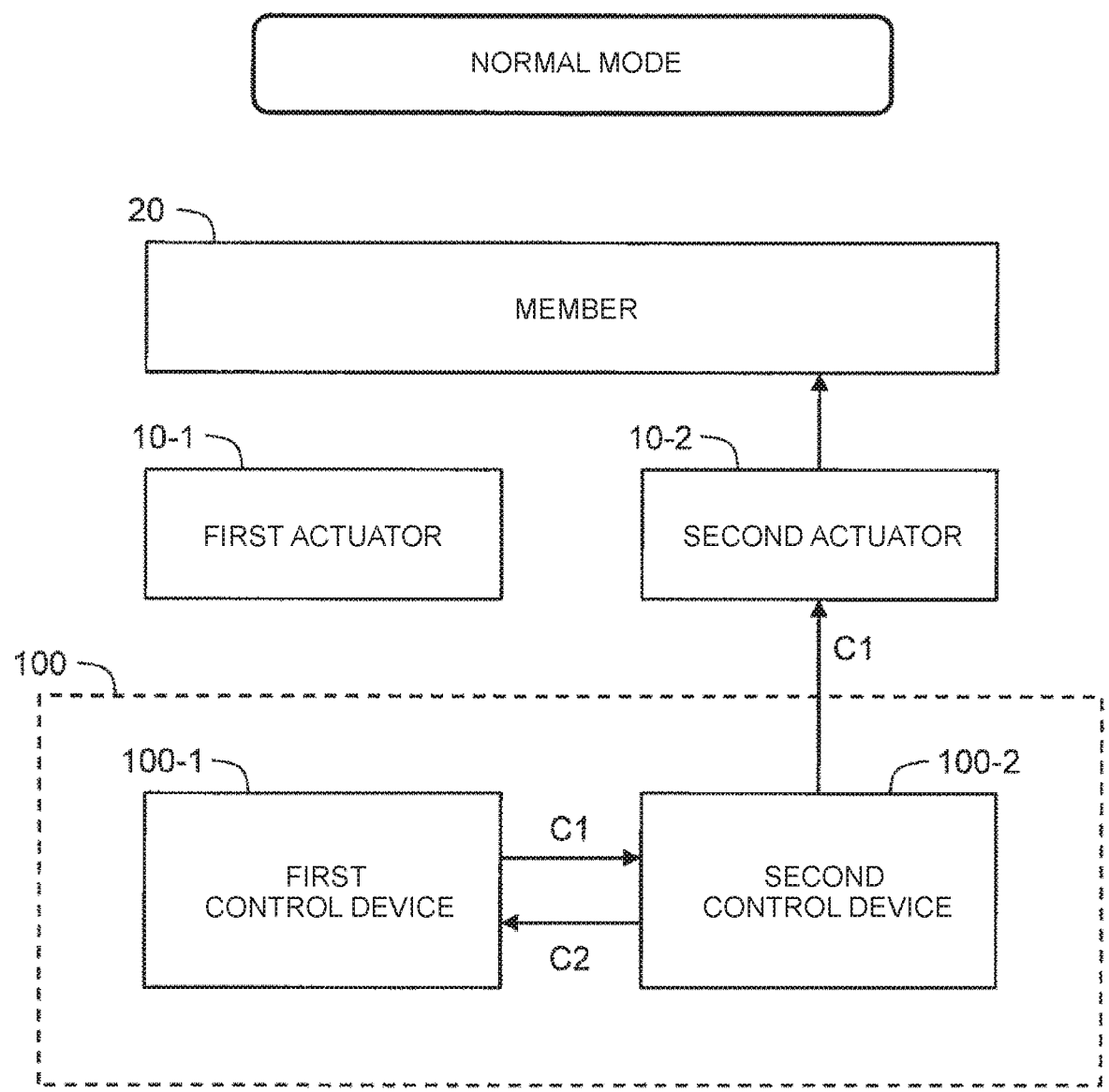
FIG. 20 is a block diagram useful for describing the normal mode of the control device according to the third embodiment of the disclosure.

FIG. 19 and FIG. 20 are block diagrams useful for describing the normal mode according to the third embodiment. According to the third embodiment, the control device 100, which is in the normal mode, controls only one of the first actuator 10-1 and the second actuator 10-2 according to the first controlled variable C1. In this case, too, noise and vibration are less likely or unlikely to be generated in the actuator 10.

In an example shown in FIG. 19, the first control device 100-1 controls the first actuator 10-1 according to the first controlled variable C1 computed by itself. The second control device 100-2 stops control of the second actuator 10-2.

In an example shown in FIG. 20, the second control device 100-2 receives the first controlled variable C1 from the first control device 100-1, and controls the second actuator 10-2 according to the received first controlled variable C1. The first control device 100-1 stops control of the first actuator 10-1.

The detection of an abnormality sign, switching from the normal mode to the independent mode, and the independent mode are identical with those of the illustrated embodiments.

In the independent mode, the first control device 100-1 controls the first actuator 10-1 according to the first controlled variable C1, and the second control device 100-2 controls the second actuator 10-2 according to the second controlled variable C1. Even when the first controlled variable C1 becomes an erroneous value, the second actuator 10-2 controlled according to the correct second controlled variable C2 generates correct force. Even when the first actuator 10-1 attempts to move the member 20 with erroneous force, the second actuator 10-2 moves the member 20 with correct force at the same time. Namely, the normal second actuator 10-2 functions to compensate for erroneous output of the first actuator 10-1. Thus, an influence of erroneous output of the actuator 10 on the member 20 is curbed (alleviated).

In this embodiment, the number of operating actuator(s) is different between the normal mode and the independent mode. Therefore, upon switching from the normal mode to the independent mode, the magnitudes of the first controlled variable C1 and the second controlled variable C2 may be changed as needed.

As one example, the case where target torque of the actuator 10 as a whole has been determined will be considered. Each of the first controlled variable C1 and the second controlled variable C2 in the normal mode is target torque of the actuator 10 as a whole, or an amount (e.g., target current) corresponding to the target torque. On the other hand, each of the first controlled variable C1 and the second controlled variable C2 in the independent mode is a half of the target torque of the actuator 10 as a whole, or an amount corresponding to it.

As another example, the case where the controlled variable is a target rotational angle of the actuator 10 (electric motor) will be considered. In this case, upon switching from the normal mode to the independent mode, the magnitudes of the first controlled variable C1 and the second controlled variable C2 need not be changed. Each of the first controlled variable C1 and the second controlled variable C2 is the target rotational angle, or an amount corresponding to the target rotational angle.

4. Fourth Embodiment

In a fourth embodiment, application of the disclosure to a steer-by-wire type vehicle will be considered. Description that overlaps that of the illustrated embodiments will be omitted as appropriate.

4-1. Configuration

Figure 21:
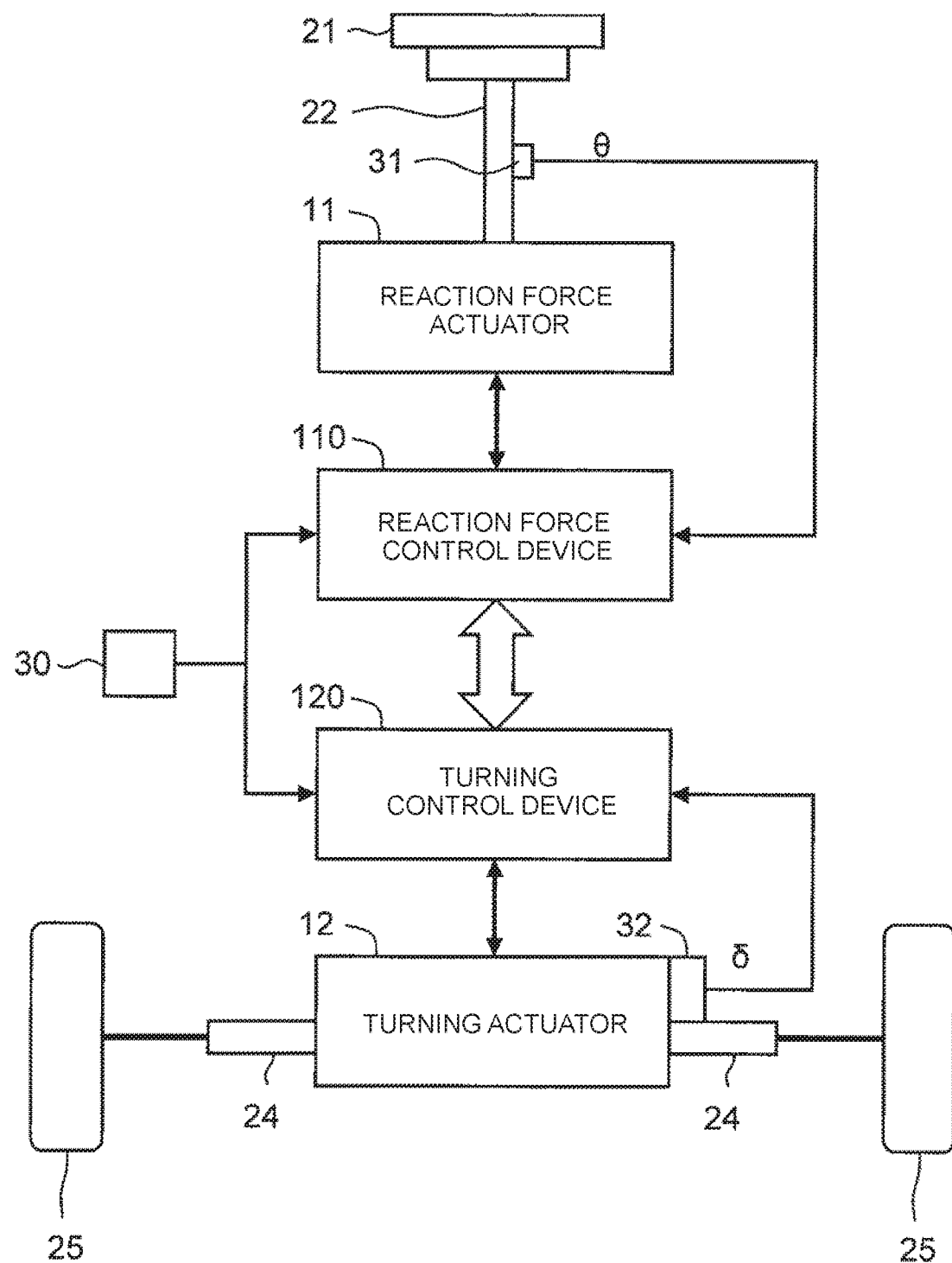
FIG. 21 is a block diagram schematically showing the configuration of a steering control system according to a fourth embodiment of the disclosure.

FIG. 21 is a block diagram schematically showing the configuration of a steering control system 1 according to the fourth embodiment. A steering wheel 21 is an operation member used by the driver for steering. A steering shaft 22 is coupled to the steering wheel 21, and rotates with the steering wheel 21. Turning shafts 24 are coupled to wheels 25. The steering wheel 21, steering shaft 22, turning shafts 24, and wheels 25 correspond to the member 20 associated with steering.

The steering wheel 21 and the wheels 25 are mechanically disconnected from each other, or may be mechanically connected to or disconnected from each other. In the following description, a condition where the steering wheel 21 and the wheels 25 are mechanically disconnected from each other will be considered.

A reaction force actuator 11 applies torque to the steering wheel 21. For example, the reaction force actuator 11 includes a reaction force motor. A rotor 8 of the reaction force motor is linked to the steering shaft 22 via a speed reducer. The reaction force motor is operable to apply torque to the steering shaft 22, and to the steering wheel 21. Operation of the reaction force actuator 11 (reaction force motor) is controlled by a reaction force control device 110.

A turning actuator 12 turns the wheels 25. For example, the turning actuator 12 includes a turning motor. A rotor 8 of the turning motor is linked to the turning shafts 24 via speed reducers. As the turning motor rotates, its rotary motion is converted to linear motion of the turning shafts 24, whereby the wheels 25 are turned. Namely, the turning motor is operable to turn the wheels 25. Operation of the turning actuator 12 (turning motor) is controlled by a turning control device 120.

The sensor 30 includes a steering angle sensor 31 and a turning angle sensor 32.

The steering angle sensor 31 detects the steering angle $\theta$ of the steering wheel 21. The steering angle sensor 31 may be a rotational angle sensor that detects the rotational angle of the reaction force motor. In this case, the steering angle $\theta$ is calculated from the rotational angle of the reaction force motor. The steering angle sensor 31 sends information of the steering angle $\theta$ to the reaction force control device 110.

The turning angle sensor 32 detects the turning angle $\delta$ of the wheels 25. For example, the turning angle sensor 32 calculates the turning angle $\delta$ from the rotational angle of the turning motor. The turning angle sensor 32 sends information indicating the turning angle $\delta$ to the turning control device 120.

The sensor 30 may further include a vehicle speed sensor that detects the vehicle speed, yaw rate sensor that detects the yaw rate, acceleration sensor that detects the acceleration, and so forth.

The reaction force control device 110 and the turning control device 120 are connected to each other such that they can communicate with each other, and send and receive necessary information to and from each other. For example, the reaction force control device 110 sends information of the steering angle $\theta$ of the steering wheel 21 to the turning control device 120. On the other hand, the turning control device 120 sends information of the turning angle $\delta$ of the wheels 25 to the reaction force control device 110.

The turning control device 120 performs "turning control" to turn the wheels 25, according to steering operation of the steering wheel 21 by the driver. More specifically, the turning control device 120 controls the turning actuator 12, so as to turn the wheels 25 in synchronization with the steering angle $\theta$. For example, the turning control device 120 calculates a target turning angle St, based on the steering angle θ and the vehicle speed. Then, the turning control device 120 controls operation of the turning actuator 12, so that the turning angle δ of the wheels 25 follows the target turning angle δt. At this time, the turning control device 120 determines the controlled variable C for controlling the turning actuator 12, based on a deviation of the turning angle δ from the target turning angle δt. The turning actuator 12 is driven according to the controlled variable C, and operates to turn the wheels 25.

The reaction force control device 110 performs "reaction torque control" to apply reaction torque to the steering wheel 21, according to steering operation of the steering wheel 21 by the driver. More specifically, the reaction force control device 110 controls the reaction force actuator 11, so as to apply reaction torque to the steering wheel 21. The reaction torque simulates steering reaction force sensed by the driver during steering operation. For example, the reaction force control device 110 calculates target reaction torque (spring component) corresponding to self-aligning torque applied to the wheels 25, based on the steering angle θ and the vehicle speed. The target reaction torque may further include a damping component corresponding to the steering speed (dθ/dt). The reaction force control device 110 controls operation of the reaction force actuator 11 so as to generate target reaction torque. At this time, the reaction force control device 110 determines the controlled variable C for controlling the reaction force actuator 11, based on the target reaction torque. The reaction force actuator 11 is driven according to the controlled variable C, and operates to generate reaction torque.

4-2. Duplex Configuration

The control device 100 having the duplex configuration described in the illustrated embodiments is used as at least one of the reaction force control device 110 and the turning control device 120.

When the reaction force control device 110 is the control device 100 having the duplex configuration, the reaction force actuator 11 corresponds to the actuator 10 having the duplex configuration, and the steering wheel 21 and steering shaft 22 correspond to the member 20.

When the turning control device 120 is the control device 100 having the duplex configuration, the turning actuator 12 corresponds to the actuator 10 having the duplex configuration, and the wheels 25 and turning shafts 24 correspond to the member 20.

Figure 22:
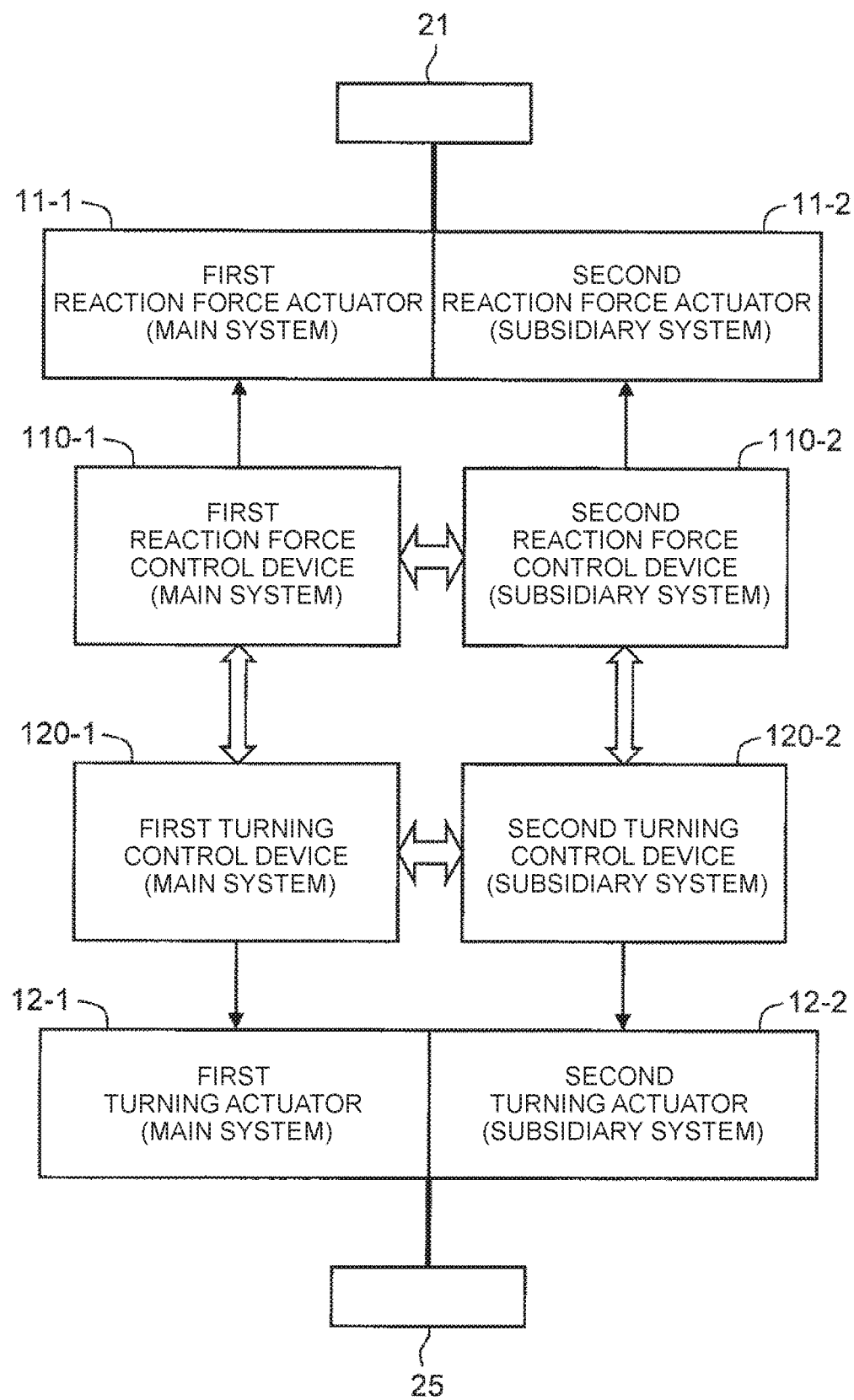
FIG. 22 is a block diagram showing an example of the duplex configuration of the steering control system according to the fourth embodiment of the disclosure.

FIG. 22 is a block diagram showing an example of the duplex configuration of the steering control system 1 according to this embodiment. In the example shown in FIG. 22, the control device 100 having the duplex configuration is used as both the reaction force control device 110 and the turning control device 120.

More specifically, the reaction force control device 110 includes a first reaction force control device 110-1 of the main system, and a second reaction force control device 110-2 of the subsidiary system. The reaction force actuator 11 includes a first reaction force actuator 11-1 of the main system, and a second reaction force actuator 11-2 of the subsidiary system. The first reaction force control device 110-1 of the main system controls the first reaction force actuator 11-1 of the main system. The second reaction force control device 110-2 of the subsidiary system controls the second reaction force actuator 11-2 of the subsidiary system.

Also, the turning control device 120 includes a first turning control device 120-1 of the main system, and a second turning control device 120-2 of the subsidiary system. The turning actuator 12 includes a first turning actuator 12-1 of the main system, and a second turning actuator 12-2 of the subsidiary system. The first turning control device 120-1 of the main system controls the first turning actuator 12-1 of the main system. The second turning control device 120-2 of the subsidiary system controls the second turning actuator 12-2 of the subsidiary system.

Further, the first reaction force control device 110-1 of the main system and the first turning control device 120-1 of the main system can communicate with each other. Similarly, the second reaction force control device 110-2 of the subsidiary system and the second turning control device 120-2 of the subsidiary system can communicate with each other.

As one example, the case where an abnormality occurs in the first reaction force control device 110-1, and the second reaction force control device 110-2 detects an abnormality sign, will be considered. In this case, the detection control device 100-A is the second reaction force control device 110-2. The notified control device 100-B includes not only the first reaction force control device 110-1, but also the first turning control device 120-1 and the second turning control device 120-2. The second reaction force control device 110-2 informs switching from the normal mode to the independent mode, to all of the first reaction force control device 110-1, first turning control device 120-1, and second turning control device 120-2. A switching notification is transmitted to the first turning control device 120-1, via the second turning control device 120-2, for example. Each of the first reaction force control device 110-1, first turning control device 120-1, and second turning control device 120-2 switches the operating mode from the normal mode to the independent mode, in response to the switching notification.

4-3. Effect

According to this embodiment, effects similar to those obtained in the illustrated embodiments are obtained in the steer-by-wire type vehicle.

When the control device 100 is used as the reaction force control device 110, erroneous reaction torque control is promptly curbed. Thus, the driver is less likely or unlikely to feel strange or uncomfortable about reaction torque. Also, the steering wheel 21 is less likely or unlikely to be unexpectedly steered, without depending on the driver's intention, due to the erroneous reaction force. Since the steering wheel 21 is less likely or unlikely to be unexpectedly steered, the wheels 25 are also less likely or unlikely to be unexpectedly turned. Namely, the vehicle is less likely or unlikely to travel in an erroneous direction.

Also, when the control device 100 is used as the turning control device 120, erroneous turning control is promptly curbed. Thus, the wheels 25 are less likely or unlikely to be turned unexpectedly. Namely, the vehicle is less likely or unlikely to travel in an erroneous direction.

In the case of the steer-by-wire type vehicle, the steering wheel 21 is mechanically disconnected from the wheels 25; therefore, the driver is less likely to notice that the direction of the wheels 25 goes wrong. When correction of the direction by the driver is delayed, a deviation of the vehicle traveling direction becomes large. Accordingly, it is particularly significant to use the control device 100 having the duplex configuration in the steer-by-wire type vehicle.

5. Fifth Embodiment

In a fifth embodiment, application of the disclosure to a steering control system 1 including EPS (Electric Power Steering) will be considered. Description that overlaps that of the illustrated embodiments will be omitted as appropriate.

5-1. Configuration

Figure 23:
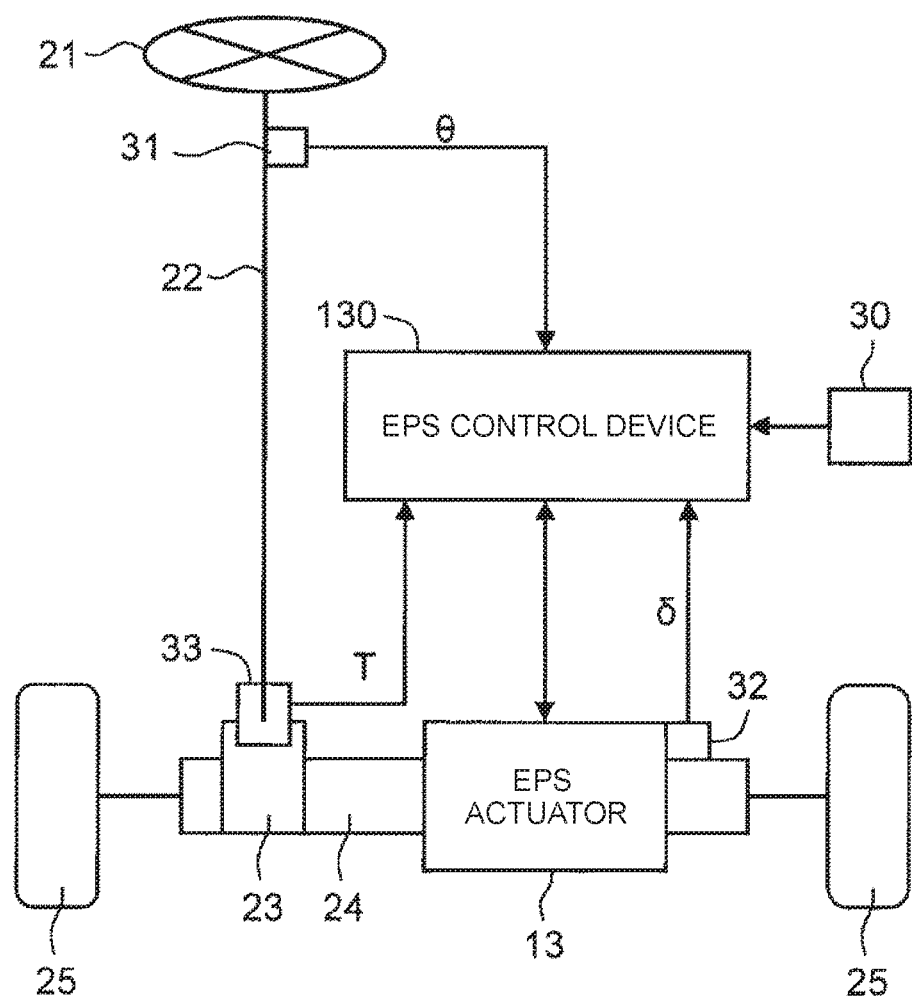
FIG. 23 is a block diagram schematically showing the configuration of a steering control system according to a fifth embodiment of the disclosure.

FIG. 23 is a block diagram schematically showing the configuration of the steering control system 1 according to the fifth embodiment. One end of a steering shaft 22 is coupled to a steering wheel 21, and the other end is coupled to a steering gear box 23. The steering gear box 23 includes a rack and a pinion, for example. Rotary motion of the steering wheel 21 is converted into linear motion of turning shafts 24, via the steering shaft 22 and the steering gear box 23, and the wheels 25 are turned by use of the linear motion.

The EPS actuator 13 assists turning of the wheels 25. For example, the EPS actuator 13 includes an EPS motor. A rotor 8 of the EPS motor is linked to the turning shafts 24 via speed reducers. As the EPS motor rotates, its rotary motion is converted into linear motion of the turning shafts 24, whereby the wheels 25 are turned. Namely, the EPS motor is operable to turn the wheels 25. Operation of the EPS actuator 13 (EPS motor) is controlled by an EPS control device 130.

The sensor 30 includes a steering torque sensor 33, in addition to the steering angle sensor 31 and the turning angle sensor 32. The steering torque sensor 33 detects steering torque T applied to the steering shaft 22. The steering torque sensor 33 outputs information indicating the steering torque T, to the EPS control device 130.

The EPS control device 130 performs "assist control" for reducing a steering burden when the driver performs steering operation. Under the assist control, the EPS control device 130 controls the EPS actuator 13 so as to assist turning of the wheels 25. For example, the EPS control device 130 calculates target assist torque, based on the steering torque T and the vehicle speed. Typically, the target assist torque increases as the steering torque T increases. Then, the EPS control device 130 controls operation of the EPS actuator 13 so as to generate the target assist torque. At this time, the EPS control device 130 determines the controlled variable C for controlling the EPS actuator 13, based on the target assist torque. The EPS actuator 13 is driven according to the controlled variable C, and operates to generate assist torque. Turning of the wheels 25 is assisted with the assist torque, and the steering burden on the driver is reduced.

5-2. Duplex Configuration

The control device 100 having the duplex configuration as described above in the illustrated embodiments is used as the EPS control device 130. The EPS actuator 13 corresponds to the actuator 10 having the duplex configuration, and the wheels 25 and the turning shafts 24 correspond to the member 20.

According to this embodiment, effects similar to those of the illustrated embodiments are obtained with regard to assist control. Thus, since erroneous assist control is curbed, excessive assist torque is less likely or unlikely to be generated. Consequently, the driver is less likely or unlikely to feel strange or uncomfortable about the assist control.

What is claimed is:

1. A steering control system that controls steering of a vehicle, the steering control system comprising:
   an actuator configured to apply force to a member associated with the steering, the actuator having a duplex configuration including a first actuator of a main system and a second actuator of a subsidiary system; and
   a control device configured to control the actuator, the control device having a duplex configuration including a first control device that belongs to the main system, and a second control device that belongs to the subsidiary system, the first control device and the second control device being configured to compute the same controlled variable as a first controlled variable and a second controlled variable, respectively, wherein
   the control device has operating modes including a normal mode in which at least one of the first actuator and the second actuator is controlled according to the first controlled variable, without using the second controlled variable, and an independent mode in which the first control device controls the first actuator according to the first controlled variable, and the second control device controls the second actuator according to the second controlled variable,
   the first control device and the second control device are configured to communicate with each other in the normal mode,
   in the normal mode, the first control device is configured to send the first controlled variable to the second control device, and the second control device is configured to send the second controlled variable to the first control device, and
   the control device is configured to switch the operating mode from the normal mode to the independent mode, in at least one of a case where a discrepancy arises between the first controlled variable and the second controlled variable, and a case where a communication abnormality occurs in communications between the first control device and the second control device.

2. The steering control system according to claim 1, wherein:
   each of the first control device and the second control device has a self-diagnosis function of detecting an abnormality in itself;
   the operating modes of the control device further include a backup mode in which, when occurrence of the abnormality in one of the first control device and the second control device is confirmed through the self-diagnosis function, the other of the first control device and the second control device controls the actuator; and
   a start time of the independent mode is earlier than that of the backup mode.

3. The steering control system according to claim 1, wherein, in the normal mode, the first control device controls the first actuator according to the first controlled variable, and the second control device controls the second actuator according to the first controlled variable received from the first control device.

4. The steering control system according to claim 1, wherein, in the normal mode, the first control device determines whether the discrepancy or the communication abnormality has occurred, based on the second controlled variable received from the second control device, and the second control device determines whether the discrepancy or the communication abnormality has occurred, based on the first controlled variable received from the first control device.

5. The steering control system according to claim 4, wherein:
   the first control device determines that the discrepancy has occurred when a difference between the first controlled variable and the second controlled variable received from the second control device is equal to or larger than a threshold value; and
   the second control device determines that the discrepancy has occurred when a difference between the second controlled variable and the first controlled variable received from the first control device is equal to or larger than the threshold value.

6. The steering control system according to claim 4, wherein:
   one of the first control device and the second control device is a detection control device configured to detect the discrepancy or the communication abnormality; and
   when the discrepancy or the communication abnormality is detected, the detection control device is configured to start operating in the independent mode, and notifies the other of the first control device and the second control device of switching from the normal mode to the independent mode, the other of the first control device and the second control device being configured to start operating in the independent mode, in response to a notification from the detection control device.

7. The steering control system according to claim 1, wherein:
   the vehicle is a steer-by-wire vehicle including a steering wheel and wheels that are mechanically disconnected from each other;
   the steering control system further comprises a turning actuator configured to turn the wheels, a reaction force actuator configured to apply reaction torque to the steering wheel, a turning control device configured to control the turning actuator according to steering operation of the steering wheel, and a reaction force control device configured to control the reaction force actuator according to the steering operation of the steering wheel;
   at least one of the turning control device and the reaction force control device is the control device having the duplex configuration;
   when the turning control device is the control device having the duplex configuration, the member comprises the wheels, and the turning actuator is the actuator having the duplex configuration; and
   when the reaction force control device is the control device having the duplex configuration, the member comprises the steering wheel, and the reaction force actuator is the actuator having the duplex configuration.

8. The steering control system according to claim 7, wherein:
   each of the turning control device and the reaction force control device is the control device having the duplex configuration; and
   when one of the turning control device and the reaction force control device switches the operating mode from the normal mode to the independent mode, the other of the turning control device and the reaction force control device is configured to switch the operating mode from the normal mode to the independent mode.

* * * * *